United States Patent
Einberg et al.

(10) Patent No.: US 11,087,572 B2
(45) Date of Patent: Aug. 10, 2021

(54) CONTINUOUS AUTHENTICATION

(71) Applicant: ASSA ABLOY AB, Stockholm (SE)

(72) Inventors: Fredrik Carl Stefan Einberg, Huddinge (SE); Daniel Berg, Sundbyberg (SE)

(73) Assignee: ASSA ABLOY AB, Stockholm (SE)

( * ) Notice: Subject to any disclaimer, the term of this patent is extended or adjusted under 35 U.S.C. 154(b) by 201 days.

(21) Appl. No.: 15/569,355

(22) PCT Filed: May 2, 2016

(86) PCT No.: PCT/EP2016/059750
§ 371 (c)(1),
(2) Date: Oct. 25, 2017

(87) PCT Pub. No.: WO2016/177669
PCT Pub. Date: Nov. 10, 2016

(65) Prior Publication Data
US 2018/0302416 A1    Oct. 18, 2018

Related U.S. Application Data

(60) Provisional application No. 62/198,240, filed on Jul. 29, 2015, provisional application No. 62/197,985, (Continued)

(51) Int. Cl.
*G07C 9/00* (2020.01)
*H04L 29/06* (2006.01)
(Continued)

(52) U.S. Cl.
CPC ......... *G07C 9/00309* (2013.01); *G06F 1/163* (2013.01); *G07C 9/00174* (2013.01); (Continued)

(58) Field of Classification Search
CPC ............ G07C 9/00309; G07C 9/00087; G07C 9/00111; G07C 9/00174; G07C 9/00571; (Continued)

(56) References Cited

U.S. PATENT DOCUMENTS

| | | | |
|---|---|---|---|
| 6,374,356 | B1 | 4/2002 | Daigneault et al. |
| 6,719,200 | B1 | 4/2004 | Wiebe |

(Continued)

FOREIGN PATENT DOCUMENTS

| | | |
|---|---|---|
| CN | 101272251 | 9/2008 |
| EP | 1710974 | 10/2005 |

(Continued)

OTHER PUBLICATIONS

International Preliminary Report on Patentability for International (PCT) Patent Application No. PCT/EP2016/059750, dated Nov. 16, 2017 8 pages.

(Continued)

*Primary Examiner* — Samson B Lemma
*Assistant Examiner* — Zoha Piyadehghibi Tafaghodi
(74) *Attorney, Agent, or Firm* — Sheridan Ross P.C.

(57) ABSTRACT

Methods, devices, and systems are provided for providing continuous authentication to a user having a wearable device in an access control system. The wearable device allows the authentication of the user to be maintained until an authentication interruption signal is received. The interruption signal may be based on user biometrics, a state of the wearable device, a communication range of the wearable device with a trusted mobile device, and more. Upon receiving the interruption signal, the continuous authentication for the wearable device, and the user, may be revoked, destroyed, or disabled.

20 Claims, 9 Drawing Sheets

Related U.S. Application Data filed on Jul. 28, 2015, provisional application No. 62/197,645, filed on Jul. 28, 2015, provisional application No. 62/167,136, filed on May 27, 2015, provisional application No. 62/167,172, filed on May 27, 2015, provisional application No. 62/164,099, filed on May 20, 2015, provisional application No. 62/162,273, filed on May 15, 2015, provisional application No. 62/161,640, filed on May 14, 2015, provisional application No. 62/156,035, filed on May 1, 2015, provisional application No. 62/156,030, filed on May 1, 2015.

(51) Int. Cl.

| | |
|---|---|
| H04W 12/08 | (2021.01) |
| H04L 9/32 | (2006.01) |
| H04W 12/06 | (2021.01) |
| G07C 9/28 | (2020.01) |
| G07C 9/25 | (2020.01) |
| G08B 7/06 | (2006.01) |
| G08B 25/01 | (2006.01) |
| H04W 12/04 | (2021.01) |
| G06F 1/16 | (2006.01) |
| H04B 1/3827 | (2015.01) |
| G06F 21/34 | (2013.01) |
| H04W 4/80 | (2018.01) |
| H04W 12/63 | (2021.01) |
| H04W 12/68 | (2021.01) |
| G06K 9/00 | (2006.01) |
| H04W 88/02 | (2009.01) |

(52) U.S. Cl.
CPC .......... *G07C 9/00571* (2013.01); *G07C 9/257* (2020.01); *G07C 9/28* (2020.01); *G08B 7/066* (2013.01); *G08B 25/016* (2013.01); *H04B 1/385* (2013.01); *H04L 9/3226* (2013.01); *H04L 63/0428* (2013.01); *H04L 63/062* (2013.01); *H04L 63/083* (2013.01); *H04L 63/0853* (2013.01); *H04L 63/0861* (2013.01); *H04L 63/0876* (2013.01); *H04L 63/108* (2013.01); *H04W 12/04* (2013.01); *H04W 12/06* (2013.01); *H04W 12/08* (2013.01); *G06F 21/34* (2013.01); *G06K 9/00885* (2013.01); *G07C 9/00563* (2013.01); *G07C 2009/00769* (2013.01); *H04L 2463/121* (2013.01); *H04W 4/80* (2018.02); *H04W 12/63* (2021.01); *H04W 12/68* (2021.01); *H04W 88/02* (2013.01)

(58) Field of Classification Search
CPC ...... G07C 9/00563; G07C 2009/00769; G06F 1/163; G06F 21/34; G08B 7/066; G08B 25/016; H04B 1/385; H04L 9/3226; H04L 63/0428; H04L 63/062; H04L 63/083; H04L 63/0853; H04L 63/0861; H04L 63/0876; H04L 63/108; H04L 2463/121; H04W 12/04; H04W 12/06; H04W 12/08; H04W 4/80; H04W 12/00503; H04W 12/00508; H04W 88/02; G06K 9/00885

See application file for complete search history.

(56) References Cited

U.S. PATENT DOCUMENTS

| | | | |
|---|---|---|---|
| 6,766,450 B2 | 7/2004 | Micali | |
| 7,706,778 B2 | 4/2010 | Lowe | |
| 8,074,271 B2 | 12/2011 | Davis et al. | |
| 8,184,983 B1 | 5/2012 | Ho et al. | |
| 9,269,208 B2 | 2/2016 | Burke | |
| 9,280,860 B2 | 3/2016 | Malhotra et al. | |
| 9,344,436 B1 | 5/2016 | Sheng et al. | |
| 9,672,727 B1 | 6/2017 | Alexander et al. | |
| 9,779,568 B2 | 10/2017 | Shibutani et al. | |
| 9,942,222 B1 | 4/2018 | Fenton et al. | |
| 2002/0178385 A1 | 11/2002 | Dent et al. | |
| 2003/0141977 A1 | 7/2003 | Brown et al. | |
| 2003/0144952 A1 | 7/2003 | Brown et al. | |
| 2005/0151640 A1 | 7/2005 | Hastings | |
| 2007/0024417 A1 | 2/2007 | Gerstenkorn | |
| 2007/0204349 A1 | 8/2007 | Sparks et al. | |
| 2008/0068183 A1 | 3/2008 | Diamant | |
| 2008/0089521 A1 | 4/2008 | Le Saint et al. | |
| 2008/0284564 A1 | 11/2008 | Leitch | |
| 2010/0122350 A1 | 5/2010 | Munje et al. | |
| 2010/0274100 A1 | 10/2010 | Behar et al. | |
| 2010/0304716 A1 | 12/2010 | Hoeksel et al. | |
| 2011/0214158 A1 | 9/2011 | Pasquero et al. | |
| 2012/0112901 A1 | 5/2012 | Chasko | |
| 2012/0126940 A1 | 5/2012 | Coggill | |
| 2012/0167232 A1 | 6/2012 | Moosavi et al. | |
| 2012/0311675 A1 | 12/2012 | Ham et al. | |
| 2013/0015947 A1 | 1/2013 | Best | |
| 2013/0024374 A1 | 1/2013 | Weiss | |
| 2013/0044055 A1 | 2/2013 | Karmarkar et al. | |
| 2013/0060577 A1 | 3/2013 | Debusk et al. | |
| 2013/0086375 A1 | 4/2013 | Lyne et al. | |
| 2013/0091561 A1 | 4/2013 | Brusso et al. | |
| 2013/0095802 A1 | 4/2013 | Wang | |
| 2013/0124855 A1 | 5/2013 | Varadarajan et al. | |
| 2013/0212248 A1 | 8/2013 | Neafsey et al. | |
| 2013/0257613 A1 | 10/2013 | Jarman et al. | |
| 2013/0324081 A1 | 12/2013 | Gargi | |
| 2014/0056220 A1 | 2/2014 | Poitau et al. | |
| 2014/0091903 A1 | 4/2014 | Birkel et al. | |
| 2014/0120905 A1 | 5/2014 | Kim | |
| 2014/0165165 A1 | 6/2014 | Story, Jr. | |
| 2014/0173690 A1 | 6/2014 | Ekberg et al. | |
| 2014/0197948 A1 | 7/2014 | Mo et al. | |
| 2014/0225713 A1 | 8/2014 | McIntyre et al. | |
| 2014/0282877 A1 | 9/2014 | Mahaffey et al. | |
| 2014/0282927 A1 | 9/2014 | McLaughlin et al. | |
| 2014/0341441 A1* | 11/2014 | Slaby | G06F 21/32 |
| | | | 382/117 |
| 2014/0359722 A1 | 12/2014 | Shultz et al. | |
| 2014/0373111 A1 | 12/2014 | Moss et al. | |
| 2015/0017979 A1 | 1/2015 | Kang et al. | |
| 2015/0028996 A1* | 1/2015 | Agrafioti | G06F 21/34 |
| | | | 340/5.82 |
| 2015/0067803 A1 | 3/2015 | Alduaiji | |
| 2015/0070134 A1 | 3/2015 | Nagisetty et al. | |
| 2015/0121465 A1 | 4/2015 | Berns et al. | |
| 2015/0140964 A1 | 5/2015 | Horton | |
| 2015/0161876 A1 | 6/2015 | Castillo | |
| 2015/0172897 A1 | 6/2015 | Mariathasan et al. | |
| 2015/0309767 A1 | 10/2015 | Osoinach et al. | |
| 2016/0036965 A1 | 2/2016 | Kim | |
| 2016/0165450 A1* | 6/2016 | Hunt | G06F 3/0412 |
| | | | 726/19 |
| 2016/0274556 A1 | 9/2016 | Murphy | |
| 2016/0283737 A1 | 9/2016 | Soman et al. | |
| 2016/0294817 A1* | 10/2016 | Tan | G06Q 20/12 |
| 2016/0359864 A1* | 12/2016 | Dhaliwal | H04L 63/102 |
| 2017/0208464 A1 | 7/2017 | Guertler et al. | |
| 2017/0220791 A1* | 8/2017 | Shibutani | G06F 21/35 |

FOREIGN PATENT DOCUMENTS

| | | |
|---|---|---|
| EP | 1760671 | 3/2007 |
| EP | 1895445 | 3/2008 |
| EP | 1926038 | 5/2008 |
| EP | 2434461 | 3/2012 |
| EP | 2469816 | 6/2012 |
| EP | 2493232 | 8/2012 |
| EP | 2620919 | 7/2013 |
| EP | 2809046 | 12/2014 |

(56) References Cited

FOREIGN PATENT DOCUMENTS

| EP | 2938112 | 10/2015 |
|----|---------|---------|
| GB | 2402840 | 12/2004 |
| WO | WO 2004/025545 | 3/2004 |
| WO | WO 2005/024549 | 3/2005 |
| WO | WO 2007/121414 | 10/2007 |
| WO | WO 2009/089208 | 7/2009 |
| WO | WO 2009/127984 | 10/2009 |
| WO | WO 2009/143415 | 11/2009 |
| WO | WO 2012/113080 | 8/2012 |
| WO | WO 2013/118454 | 8/2013 |
| WO | WO 2014/098755 | 6/2014 |
| WO | WO 2014/172325 | 10/2014 |
| WO | WO 2014/191537 | 12/2014 |
| WO | WO 2015/048349 | 4/2015 |
| WO | WO 2016/167895 | 10/2016 |
| WO | WO 2016/177666 | 11/2016 |
| WO | WO 2016/177668 | 11/2016 |
| WO | WO 2016/177671 | 11/2016 |
| WO | WO 2016/177672 | 11/2016 |
| WO | WO 2016/177673 | 11/2016 |
| WO | WO 2016/177674 | 11/2016 |
| WO | WO 2016/178081 | 11/2016 |
| WO | WO 2016/178082 | 11/2016 |
| WO | WO 2016/178085 | 11/2016 |

OTHER PUBLICATIONS

Official Action for U.S. Appl. No. 15/569,105, dated Jun. 25, 2018 19 pages.
International Search Report and Written Opinion for International (PCT) Patent Application No. PCT/EP2016/059746, dated Jul. 22, 2016 11 pages.
Second Written Opinion for International (PCT) Patent Application No. PCT/EP2016/059746, dated Mar. 31, 2017 6 pages.
International Preliminary Report on Patentability for International (PCT) Patent Application No. PCT/EP2016/059746, dated Jul. 26, 2017 17 pages.
International Search Report and Written Opinion for International (PCT) Patent Application No. PCT/IB2016/000654, dated Aug. 8, 2016 13 pages.
Second Written Opinion for International (PCT) Patent Application No. PCT/IB2016/000654, dated Jun. 7, 2017 8 pages.
International Preliminary Report on Patentability for International (PCT) Patent Application No. PCT/IB2016/000654, dated Sep. 4, 2017 22 pages.
International Search Report and Written Opinion for International (PCT) Patent Application No. PCT/EP2016/059748, dated Jun. 24, 2016 13 pages.
Second Written Opinion for International (PCT) Patent Application No. PCT/EP2016/059748, dated Mar. 30, 2017 8 pages.
International Preliminary Report on Patentability for International (PCT) Patent Application No. PCT/EP2016/059748, dated Jun. 29, 2017 19 pages.
International Search Report and Written Opinion for International (PCT) Patent Application No. PCT/IB2016/000653, dated Sep. 2, 2016 12 pages.
Second Written Opinion for International (PCT) Patent Application No. PCT/IB2016/000653, dated Apr. 28, 2017 6 pages.
International Preliminary Report on Patentability for International (PCT) Patent Application No. PCT/IB2016/000653, dated Jul. 27, 2017 7 pages.
International Search Report and Written Opinion for International (PCT) Patent Application No. PCT/EP2016/059753, dated Jun. 3, 2016 11 pages.
Second Written Opinion for International (PCT) Patent Application No. PCT/EP2016/059753, dated Mar. 31, 2017 6 pages.
International Preliminary Report on Patentability for International (PCT) Patent Application No. PCT/EP2016/059753, dated Jul. 3, 2017 18 pages.
International Search Report and Written Opinion for International (PCT) Patent Application No. PCT/EP2016/059752, dated Jul. 26, 2016 12 pages.
Second Written Opinion for International (PCT) Patent Application No. PCT/EP2016/059752, dated Mar. 29, 2017 6 pages.
International Preliminary Report on Patentability for International (PCT) Patent Application No. PCT/EP2016/059752, dated Jun. 28, 2017 17 pages.
International Search Report and Written Opinion for International (PCT) Patent Application No. PCT/EP2016/059754, dated Jun. 8, 2016 12 pages.
Second Written Opinion for International (PCT) Patent Application No. PCT/EP2016/059754, dated Mar. 21, 2017 5 pages.
International Preliminary Report on Patentability for International (PCT) Patent Application No. PCT/EP2016/059754, dated Jun. 19, 2017 19 pages.
International Search Report and Written Opinion for International (PCT) Patent Application No. PCT/EP2016/059756, dated Jun. 27, 2016 11 pages.
Second Written Opinion for International (PCT) Patent Application No. PCT/EP2016/059756, dated Mar. 31, 2017 6 pages.
International Preliminary Report on Patentability for International (PCT) Patent Application No. PCT/EP2016/059756, dated Jul. 3, 2017 17 pages.
International Search Report and Written Opinion for International (PCT) Patent Application No. PCT/IB2016/000669, dated Aug. 1, 2016 12 pages.
Second Written Opinion for International (PCT) Patent Application No. PCT/IB2016/000669, dated Apr. 6, 2017 6 pages.
Notice of Allowance for U.S. Appl. No. 15/569,218, dated May 15, 2019 9 pages.
Official Action for U.S. Appl. No. 15/569,196, dated Mar. 22, 2019 17 pages.
Advisory Action for U.S. Appl. No. 15/569,105, dated Mar. 11, 2019 5 pages.
International Search Report for International Patent Application No. PCT/EP2016/059750, dated Aug. 2, 2016, 6 pages.
Written Opinion for International Patent Application No. PCT/EP2016/059750, dated Aug. 2, 2016, 6 pages.
Official Action for U.S. Appl. No. 15/569,218, dated Nov. 16, 2018 14 pages.
Official Action for U.S. Appl. No. 15/569,105, dated Nov. 23, 2018 24 pages.
Notice of Allowance for U.S. Appl. No. 15/568,934, dated Jul. 15, 2019 21 pages.
Official Action for U.S. Appl. No. 15/569,196, dated Jun. 11, 2019 22 pages.
Official Action for U.S. Appl. No. 15/569,208, dated Sep. 12, 2019 12 pages.
Notice of Allowance for U.S. Appl. No. 15/569,105, dated Jul. 16, 2019 13 pages.
Official Action for U.S. Appl. No. 15/569,196, dated Jan. 23, 2020 23 pages.
Notice of Allowance for U.S. Appl. No. 15/569,208, dated Feb. 3, 2020 9 pages.
Official Action with English Translation for China Patent Application No. 201680032259.1, dated Mar. 12, 2020, 22 pages.
Ballendat et al. "Proxemic Interaction: Designing for a Proximity and Orientation-Aware Environment," ACM, ITS 2010: Context 2, Nov. 7-10, 2010, Saarbrucken, Germany, pp. 121-130.
Diez et al. "Toward Self-Authenticable Wearable Devices," IEEE Wireless Communications, Feb. 2015, vol. 22, No. 1, pp. 36-43.
Sorber et al. "An Amulet for Trustworthy Wearable mHealth," ACM, HotMobile 2012, Feb. 28-29, 2012, San Diego, California, USA, 6 pages.
Vu et al. "Personal Touch-Identification Tokens," IEEE, 2013, vol. 12, No. 2, pp. 10-13.
Notice of Allowance for U.S. Appl. No. 15/569,196, dated Jul. 23, 2020 16 pages.
Notice of Opposition for European Patent Application No. 16720406.4, dated Mar. 30, 2021, 27 pages.

* cited by examiner

CONTINUOUS AUTHENTICATION

CROSS REFERENCE TO RELATED APPLICATIONS

The present application is a national stage application under 35 U.S.C. 371 of PCT Application No. PCT/EP2016/059750, having an international filing date of May 2, 2016, which designated the U.S., which claimed the benefits of and priority, under 35 U.S.C. § 119(e), to U.S. Provisional Application Ser. No. 62/156,035, filed on May 1, 2015, entitled "Authentication Channel Flow through Wearable"; 62/156,030, filed on May 1, 2015, entitled "Using Multiple Mobile Devices to Determine Position, Location, or Inside/Outside Door"; 62/161,640, filed on May 14, 2015, entitled "Using Wearable to Determine Ingress or Egress"; 62/162,273, filed on May 15, 2015, entitled "Continuous Authentication"; 62/164,099, filed on May 20, 2015, entitled "Using a Secondary Mobile Device to Identify a Trusted Environment"; 62/167,172, filed on May 27, 2015, entitled "Method and Apparatus for Making a Decision on a Card"; 62/167,136, filed on May 27, 2015, entitled "Split Provisioning of Personal Wearable and Enterprise Phone"; 62/197,945, filed on Jul. 28, 2015, entitled "Wearable Discovery for Authentication"; 62/197,985, filed on Jul. 28, 2015, entitled "Wearable Misplacement"; and 62/198,240, filed on Jul. 29, 2015, entitled "Invisible Indication of Duress via Wearable." The entire disclosures of the applications listed above are hereby incorporated by reference, in their entirety, for all that they teach and for all purposes.

FIELD

The present disclosure is generally directed to access control systems and more specifically to devices that are configured to provide access information for access control systems.

BACKGROUND

In general, access control systems rely upon lock and key principles to grant or deny access to a secure asset. Whether the keys are configured as physical keys presented to a mechanical lock or virtual keys presented to an access control unit, most keys include specific features or characteristics that are either recognized by or match lock features before access is granted to the asset. Some access control systems employ the use of various portable devices to maintain credential information for presentation to a reading device. The portable devices are generally configured to communicate with the reading device via wireless communication protocols.

One example of a portable device includes the radio frequency identification (RFID) device, such as a contactless smart card, key fob, or the like, to store credential information that can be used to gain access to an asset. When presented to a reader/interrogator, the smart card transmits the stored credential information for verification by the reader/interrogator. The reader/interrogator processes the credential information and determines if the smart card being presented is a valid smart card. If the reader/interrogator determines that credential information associated with the smart card is valid, then the reader/interrogator initiates any number of actions including allowing the holder of the smart card access to an asset protected thereby.

Another example of a portable device can include a wireless mobile device, such as a communication device, mobile phone, smartphone, etc. In this case, credential information may be stored in a memory associated with the mobile device and communicated to a reading device using at least one wireless communication protocol available to the mobile phone.

SUMMARY

It is with respect to the above issues and other problems that the embodiments presented herein were contemplated. In general, embodiments of the present disclosure provide methods, devices, and systems for providing continuous authentication for a user having a wearable device and maintaining the authentication as long as the wearable device continues to be worn by the user. In some embodiments, the continuous authentication may maintain the authentication and privileges of authentication (e.g., access control privileges, levels of control, etc.) while the wearable device is worn without being removed or otherwise deactivated.

A wearable device can include any physical electronic device having a processor, a memory, and a communications module that is configured to be worn by, or otherwise attached to, a user. In some cases, the wearable device may be worn as an implant introduced intradermally (e.g., within the skin, etc.) and/or subdermally (e.g., under the skin, etc.) in a user. Additionally or alternatively, a wearable device may be adhered or otherwise placed into contact with the dermis of a user (e.g., supradermally or outside of the skin of a user, etc.). In some embodiments, a wearable device may be worn as an article of clothing or other accessory. Examples of wearable devices can include, but are in no way limited to, activity monitors, heart rate monitors, watches, rings, belts, bracelets, jewelry, clothing, buttons, necklaces, shoes, hats, pins, accessories, scarves, combinations and/or parts thereof, and/or any other wearable item.

In one embodiment, the wearable device may be activated for continuous authentication when the wearable device is attached to a user. For example, the wearable device may be attached to a user's clothing, body, or other item that may remain in proximity to the user. This attachment may include clasping, pinning, connecting, or otherwise fastening the wearable device to be worn by the user. In some embodiments, the continuous authentication for a wearable device may be deactivated upon determining that the wearable device is detached and/or removed from being worn by a user. By way of example, when the wearable device is detected as being removed from a user, the authentication is broken and any credentials predicated upon that continuous authentication can be revoked, disabled, etc. In some embodiments, the revocation, disabling, or otherwise altering the authentication may be based on rules associated with the continuous authentication. In one embodiment, these rules may be received at the device and issued by an issuing authority (e.g., central system, etc.) upon detecting a wearable device that is to be configured for continuous authentication.

In some embodiments, the attachment to and/or detachment from a user may be detected by one or more wearable device sensors. For example, the wearable device may employ various sensors, such as one or more of contact sensors, switches, proximity sensors, and the like to determine that a wearable device has been attached to a user. In another example, the wearable device may employ one or more sensors to determine a state of the wearable device. For instance, the wearable device can determine whether the wearable device is being worn by a user, whether the wearable device has been removed from a user, whether any interruption to the wearing of the wearable device is detected (e.g., whether the wearable device has been continuously worn by, and/or removed from, a user, timing associated therewith, etc.) Alternatively, or in addition, to the one or more sensors previously described, the sensors can include, but are not limited to, biometric sensors (e.g., heart rate, body temperature and/or heat signature, blood pressure, etc.), capacitive sensors, light sensors, temperature sensors, pressure sensors, contact sensors, combinations thereof, and the like.

By way of example, visitors to a secure facility, or location, may be issued a wearable device for authentication while visiting. For example, the wearable device may be attached to a user's clothing, body, or other item that is in proximity to the user. This attachment may include clasping, pinning, connecting, or otherwise fastening the wearable device to be worn by the user. In one embodiment, the attachment and/or the state of being attached may initiate or allow for the continuous authentication for the user having the wearable device. When the wearable device is removed or detached from being worn by a user (e.g., after the user leaves the secure facility, or location, etc.), the authentication for the user provided by the wearable device may be terminated.

In some embodiments, the continuous authentication may be based on whether the wearable device is within communication range of a mobile device. Determining whether the wearable device is within the communication range of a mobile device may be used alone or in conjunction with determining whether the wearable device is being worn to provide continuous authentication for the user having the wearable device. The communication range may be based on any number of communications protocols associated with the wearable and/or the mobile device. Examples of communications protocols can include, but are in no way limited to, the protocol or protocols associated with near field communication (NFC), radio frequency identification (RFID)(e.g., operating at 125 kHz, 13.56 kHz, etc.), Bluetooth® wireless communication, Bluetooth® Low Energy (BLE), Personal Area Network (PAN), Body Area Network (BAN), cellular communications, WiFi communications, and/or other wireless communications.

In one embodiment, the continuous authentication may be based on whether the wearable device is currently paired with a mobile device. For instance, continuous authentication may be allowed by determining that the wearable device is currently paired (at the time of detecting the wearable device and/or the mobile device) with a mobile device may (e.g., via Bluetooth® or some other wireless pairing protocol, etc.). In this example, when the pairing is broken or no longer current, the continuous authentication may be disabled, credentials may be revoked, access control decisions may be limited, etc., and/or combinations thereof. As can be appreciated, pairing may be broken manually (e.g., via a user selectively unpairing a device, etc.), automatically (e.g., via the mobile device, wearable device, access control reader, and/or other device detecting an unpairing condition, etc.), and/or in response to detecting or determining a number of conditions (location of the wearable device, location of the mobile device, access control decision updates, credential management rules, differences associated therewith, combinations thereof, and the like). In any event, the conditions and/or rules controlling the continuous authentication may be stored in a memory associated with the wearable device, the mobile device, an access control reader, an access control system, and/or the like.

Information provided by the wearable device and/or the mobile device may be used in determining whether continuous authentication of a user is allowed or needed for an access control decision. For example, the wearable device may provide a geographical location and/or position of the wearable device. In one embodiment, this location may be based on Global Positioning System (GPS) data provided by a GPS module of the wearable device. In some embodiments, the location of the wearable device may be provided based on cell tower data, WiFi information, iBeacon information, and/or some other location information provided by a location module of the wearable device. The location of the mobile device may be determined in a similar, if not identical, manner as determining the location of the wearable device. The continuous authentication may be based on determining a difference, or distance, between the location of the wearable device and the location of the mobile device. For example, once the distance passes a specific threshold value, the continuous authentication may be disabled.

In some embodiments, the access control decision may be determined by a ticket that can be sent to all of the wearable device and/or user devices. Each device may cryptographically chain the ticket such that the ticket is returned to the access control system to make the access control decision. In one embodiment, the ticket may be returned to the access control system via a different return path.

Each sensor and/or relevant access decision criterion deterministic variable may be used to derive a cryptographic key from the device key and the ticket being signed by all of the keys (e.g., proof of possession turned into a proof of sensor and/or proof of distance, etc.).

In some embodiments, putting a wearable device on (e.g., attaching a wearable device, etc.) can generate a new derived key from the wearable device key. For example, where a wearable device is detached from a user and then subsequently attached to a user, the new derived key would be generated. In this example, when the ticket returns, the ticket may serve to prove that the wearable device had been removed as based on the existence of the new derived key.

In some embodiments, the attachment state of wearable device may be associated with a time. Benefits of associating a time with the attachment state of the wearable device may allow an access control system to determine when a wearable device was put on, how long the wearable device was worn, an amount of time the wearable device was worn before being detached, a detachment time, combinations thereof, and/or the like (e.g., used in verifying that a wearable device has been worn during a specific time period by a prisoner, parolee, child, etc.). By way of example, a timer associated with the wearable device may record the amount of time that the wearable device has been attached to, and/or even detached from, a user. In some embodiments, a time stamp may be recorded each time a wearable device is attached and/or detached. In any event time information may be used by an access control system and/or the components thereof in making access control decisions and/or generating an access control report, etc.

The continuous authentication may be based on a similar physical motion at each device. For example, the physical motion may be determined from information provided by, and/or detected at, the wearable device and the mobile device. In some embodiments, the continuous authentication may be based on a cadence associated with a repetitive motion, force, or movement of the wearable device and the mobile device. The force, motion, and/or movement may be detected via one or more of a gyroscope, accelerometer, transducer, and/or other mechanical detection device associated with the wearable device and the mobile device. The motion of the wearable device may be compared to the motion of the mobile device, or vice versa, to generate comparison results. The comparison results may indicate similarities between the motion of the wearable device and the movement of the mobile device over time. Similar motion comparison results between the wearable device and the mobile device may allow a continuous authentication for a user. Dissimilar motion comparison results between the wearable device and the mobile device may be used to disable the continuous authentication for the user. In one embodiment, extreme motion of one device (e.g., the wearable device or the mobile device) but not the other may cause continuous authentication to be broken and/or disallowed.

For instance, a user carrying a mobile device and wearing a wearable device while walking may impart a similar repetitive motion, force, or movement pattern upon both the wearable device and the mobile device. Continuing this example, a user walking may provide a substantially similar force while stepping that is imparted to the wearable device and the mobile device. This force may occur with every step taken by the user (e.g., where a peak force occurs with every step that is taken at some point in time measured over a period of time, etc.). Additionally or alternatively, when a wearable device is separated from the mobile device, or vice versa, the motion results from the comparison may be determined to be different. For example, a user may leave a mobile device on a desk while walking with the wearable device in an access controlled environment. In this case, the continuous authentication may be disabled in detecting the motion of the wearable device and either not receiving motion information from the mobile device and/or receiving motion information from the mobile device that substantially differs from the motion information of the wearable device.

Similarly, other information from one or more components of the wearable device and mobile device may be used as a condition for enabling and/or disabling continuous authentication. This information may include, but is in no way limited to, temperature data, barometric pressure data, biometric data (e.g., heart rate, breathing rate, etc.), altimeter and/or altitude data, audible data (e.g., detecting similar sounds in an area around each device and comparing the detected sounds and/or sound profiles to one another determine whether continuous authentication is allowed, where matching audible data allows authentication and where nonmatching audible data disables authentication, etc.), light data (e.g., detecting similar light radiation in an area around each device and comparing the light detected at each device to determine whether continuous authentication is allowed, etc.), magnetic radiation data, other energy data, combinations thereof, and/or the like.

In some embodiments, enabling and/or disabling continuous authentication of a user may be provided automatically at the wearable device based on rules stored in a memory associated with the wearable device. In one embodiment, disabling continuous authentication of a user may be provided automatically by a reading device (e.g., a mobile device, an access control reader, etc.) based on rules stored in a memory associated with the reading device and/or the wearable device. Disabling continuous authentication may include disabling and/or destroying the credentials or keys on the wearable device and/or the mobile device.

By way of example, the rules stored in a memory associated with the wearable device and/or the mobile device may require determining that the wearable device is being worn by a specific person to allow continuous authentication. As can be appreciated, one or more sensors associated with the wearable device may determine baseline biometric characteristics (e.g., heart rate, heat signature, blood pressure, etc.) that are associated with a particular user. In some embodiments, these baseline biometric characteristics may be stored in the memory of the wearable device and/or the mobile device. As the wearable device is being worn, the one or more sensors may collect biometric characteristics used for authentication. These collected biometric characteristics may be compared against the baseline biometric characteristics stored in the memory. When the collected biometric characteristics match, or substantially match (e.g., a number of characteristics within a threshold as defined by rules, etc.), the baseline biometric characteristics, continuous authentication may be allowed. When the collected biometric characteristics do not match or substantially match (e.g., a number of characteristics within a threshold as defined by rules, etc.), the baseline biometric characteristics, continuous authentication may be disallowed and/or disabled. For example, if a first user removes a wearable device and a second user wears the wearable device, the collected biometric characteristics from the second user may not substantially match the baseline biometric characteristics of the first user stored in memory and the continuous authentication would not be allowed.

In one embodiment, the rules for credential use and/or activation in a continuous authentication system may be based on a requirement that the wearable device is working. For example, detecting the wearable device being worn by a user (e.g., via heart rate, skin sensor, clasp sensor, switch, other biometric sensor, combinations thereof, etc.). In some embodiments, if the wearable device is no longer being worn by a user, the wearable device may determine whether a trusted mobile device is within a communication range. If the trusted mobile device is not found, then the keys on the wearable device may be deleted and/or the wearable may be configured to be unusable. If the trusted mobile device is found, then the keys may be maintained (even though the wearable device is no longer being worn by the user).

In some embodiments, the concept of continuous authentication may provide for no interaction from a user having a continuously authenticated wearable device in an access controlled environment. For instance, the user having the continuously authenticated wearable device may pass through one or more access decision points (e.g., controlled access points, gates, doors, locks, etc.) without being required to actively present the wearable device, provide manual input, or otherwise interact manually with the access control system. The concept of continuous authentication may provide for a trusted proof of the state of all authentication context devices and their respective states/sensors with little or no user interaction.

Additionally or alternatively, the continuous authentication disclosed herein may include determining an intent of a user when making an access control decision. In some embodiments, this intent may require receiving an activation of a sensor or particular credential as proof of user intent. For example, a particular wearable access credential may only be released when the user actuates or presses a button or touches a touch-sensitive sensor on the wearable device that is configured to release the particular wearable access credential. These example proofs of intent may be added into the access control decision alone or in conjunction with the determination of authentication via the ticket and/or roundtrip embodiments disclosed herein.

In some embodiments, the relationships between two or more devices in the access control system may be used as a type of "trust bootstrapping" when making access control decisions.

As provided herein, the wearable device may be configured to operate in conjunction with one or more mobile devices. In some embodiments, the mobile devices may be provided by a manufacturer different from the wearable device.

The wearable device may include its own power source or use power provided from another source. In some embodiments, the wearable device may include electronics that can be powered (e.g., inductively, capacitively, wirelessly, via a wired connection, or some other mechanism) by a mobile device and/or a reading device. One example of such electronics that may be incorporated into a wearable device includes RFID components, (e.g., a capacitor, antenna, etc.). In this example, when the wearable device is presented within an RFID field provided by the mobile device and/or the reading device, the mobile device and/or the reading device provides energy via the RFID field that can be stored in the capacitor of the wearable device.

The term "computer-readable medium," as used herein, refers to any tangible data storage medium that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read instructions. When the computer-readable medium is configured as part of a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

As used herein, "credential information" is any data, set of data, encryption scheme, key, and/or transmission protocol used by a particular device (e.g., a "credential device") to authenticate and/or verify its authenticity with a reader, mobile device, and/or interrogator.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as $X_1$-$X_n$, $Y_1$-$Y_m$, and $Z_1$-$Z_o$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_o$).

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The terms "determine," "calculate," and "compute," and variations thereof, as used herein, are used interchangeably and include any type of methodology, process, mathematical operation, or technique.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The term "module" as used herein refers to any known or later developed hardware, software, firmware, artificial intelligence, fuzzy logic, or combination of hardware and software that is capable of performing the functionality associated with that element.

It should be understood that every maximum numerical limitation given throughout this disclosure is deemed to include each and every lower numerical limitation as an alternative, as if such lower numerical limitations were expressly written herein. Every minimum numerical limitation given throughout this disclosure is deemed to include each and every higher numerical limitation as an alternative, as if such higher numerical limitations were expressly written herein. Every numerical range given throughout this disclosure is deemed to include each and every narrower numerical range that falls within such broader numerical range, as if such narrower numerical ranges were all expressly written herein.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

DETAILED DESCRIPTION

Copyright and Legal Notices

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Figure 1:
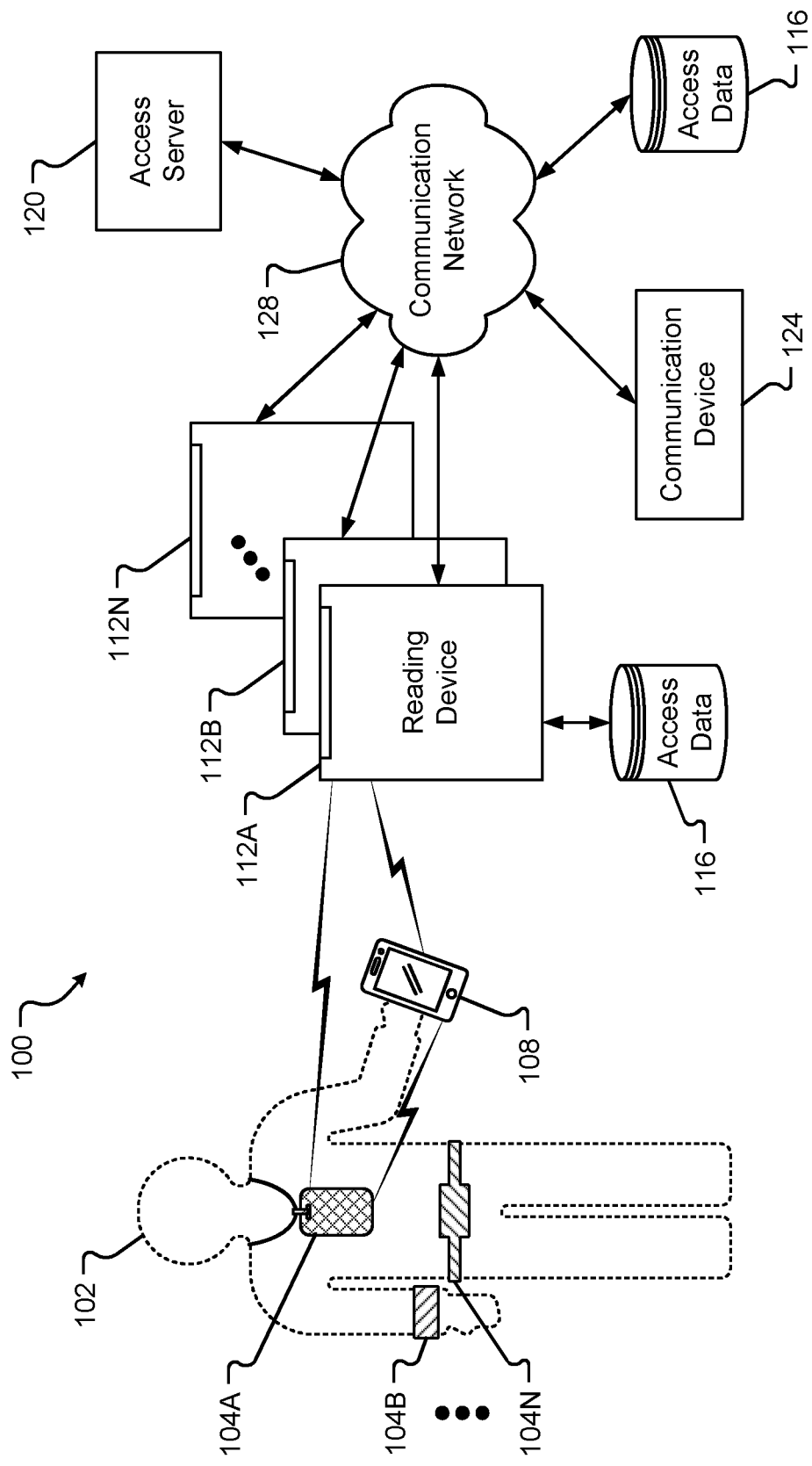
FIG. 1 is a diagram depicting an access control system in accordance with embodiments of the present disclosure.

FIG. 1 is a diagram depicting an access control system 100 for authenticating a user 102 via wearable devices 104 in accordance with embodiments of the present disclosure. In one embodiment, the access control system 100 comprises at least one reading device 112, at least one wearable device 104, and at least one portable device 108. The reading device 112 may include an access data memory 116. The access data memory 116 may be configured to store access information, identification data, rules, program instructions, and/or other data associated with performing access operations of an access control system 100. In some embodiments, the reading device 112 may be configured to communicate with an access data memory 116 across a communication network 128. The access data memory 116 may be located remotely, locally, and/or locally and remotely, from the reading device 112.

The wearable device 104 and/or the mobile device 108 may be configured to communicate with a reading device 112 across one or more wireless communication connections. These one or more wireless communication connections can include communications via at least one of conventional radio protocols, proximity-based wireless communication protocols, Bluetooth™, BLE, infrared, audible, NFC, RF, and other wireless communication networks and/or protocols. In some cases, communications between the wearable device 104 and the reading device 112 may be established automatically when the wearable device 104 enters an active zone of an interrogating reading device 112. In one embodiment, the active zone of the reading device 112 may be defined as a three-dimensional space where the intensity of RF signals emitted by the reading device 112 exceeds a threshold of sensitivity of the wearable device 104 and the intensity of RF signals emitted by the wearable device 108 exceeds a threshold of sensitivity of the reading device 112.

In some embodiments, the wearable device 104 and/or the mobile device 108 may be configured to communicate with a reading device 112 across a communication network 128. The communication network 128 can include communication via at least one of conventional radio networks, wireless communication networks, Zig-Bee, GSM, CDMA, WiFi, and/or using other communication networks and/or protocols as provided herein.

In one embodiment, authentication may be required between the wearable device 104 and the reading device 112 before further communications are enabled. Additionally or alternatively, authentication may be required between the wearable device 104 and the mobile device 108 before further communications are enabled. In any event, the further communications may provide communications in which access control information (e.g., keys, codes, credentials, etc.) are shared. In some embodiments, the authentication may be provided via one-way or mutual authentication. Examples of authentication may include, but are not limited to, simple authentication based on site codes, trusted data formats, shared secrets, and/or the like. As can be appreciated, access control information is more sensitive and may require more involved validation via, for example, an encrypted exchange of access control information.

In some embodiments, the reading device 112 may be configured to request access control information from the wearable device 104 and/or the mobile device 108. This information may be used to validate the wearable device 104. Validation may include referring to information stored in access data memory 120 or some other memory associated with the wearable device 104 and/or the mobile device 108. Typically, a reading device 112 is associated with a particular asset (e.g., a door protecting access to a secure room, a computer lock protecting sensitive information or computer files, a lock on a safe, and the like). In one embodiment, the wearable device 104 and/or the mobile device 108 may be validated via one or more components of the access control system 100. Once the wearable device 104 and/or the mobile device 108 is authenticated, credential information associated with the wearable device 104 may be validated. During this process, the reading device 112 may generate signals facilitating execution of the results of interrogating the wearable device 104 (e.g., engages/disengages a locking mechanism, allows/disallows movement of a monitored article, temporarily disables itself, activates an alarm system, provides access to a computer system, provides access to a particular document, and the like). Alternatively, the access server 120 may generate such signals.

In accordance with embodiments of the present disclosure, the reading device 112 may collect access control information associated with the wearable device 104 before an access control decision can be made. For example, the reading device 112 may require credential information stored on the wearable device 104 to validate the wearable device 104. The validity of the wearable device 104 may be based on the validity of an associated mobile device 108, or vice versa. In one embodiment, upon validating credential information stored on the wearable device 104, the reading device 112 generates signals facilitating execution of the results of interrogating the wearable device 104 and/or the mobile device 108 (e.g., engages/disengages a locking mechanism, allows/disallows movement of a monitored article, temporarily disables itself, activates an alarm system, provides access to a computer system, provides access to a particular document, and the like). As provided above, the access server 120 may generate such signals.

The access server 120 may include a processor, a memory, and one or more inputs/outputs. The memory of the access server 120 may be used in connection with the execution of application programming or instructions by the processor, and for the temporary or long term storage of program instructions and/or data. As examples, the memory may comprise RAM, DRAM, SDRAM, or other solid state memory. Additionally or alternatively, the access server 120 may communicate with an access data memory 116. Like the memory of the access server 120, the access data memory 116 may comprise a solid state memory or devices. The access data memory 116 may comprise a hard disk drive or other random access memory.

In some embodiments, the reading device 112 may be configured to communicate with one or more devices across a communication network 128. For example, the reading device 112 may communicate with a wearable device 104 and/or a mobile device 108 across the communication network 128. Among other things, this communication can allow for back-end authentication and/or provide notifications from the reading device 112 to the mobile device 108. The communication network 128 may comprise any type of known communication medium or collection of communication media and may use any type of protocols to transport messages between endpoints. The communication network 128 may include wired and/or wireless communication technologies. The Internet is an example of the communication network 128 that constitutes an Internet Protocol (IP) network consisting of many computers, computing networks, and other communication devices located all over the world, which are connected through many telephone systems and other means. Other examples of the communication network 128 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over Internet Protocol (VoIP) network, a cellular network, RS-232, similar networks used in access control systems between readers and control panels, and any other type of packet-switched or circuit-switched network known in the art. In addition, it can be appreciated that the communication network 128 need not be limited to any one network type, and instead may be comprised of a number of different networks and/or network types. Moreover, the communication network 128 may comprise a number of different communication media such as coaxial cable, copper cable/wire, fiber-optic cable, antennas for transmitting/receiving wireless messages, and combinations thereof.

In some embodiments, the access control system 100 may include at least one communication device 124. A communication device 124 may include, but is not limited to, a mobile phone, smartphone, smart watch, soft phone, telephone, intercom device, computer, tablet, mobile computer, alarm, bell, notification device, pager, and/or other device configured to convert received electrical and/or communication signals. In one embodiment, the communication device 124 may be used to receive communications sent from the wearable device 104 via the reading device 112.

Figure 2:
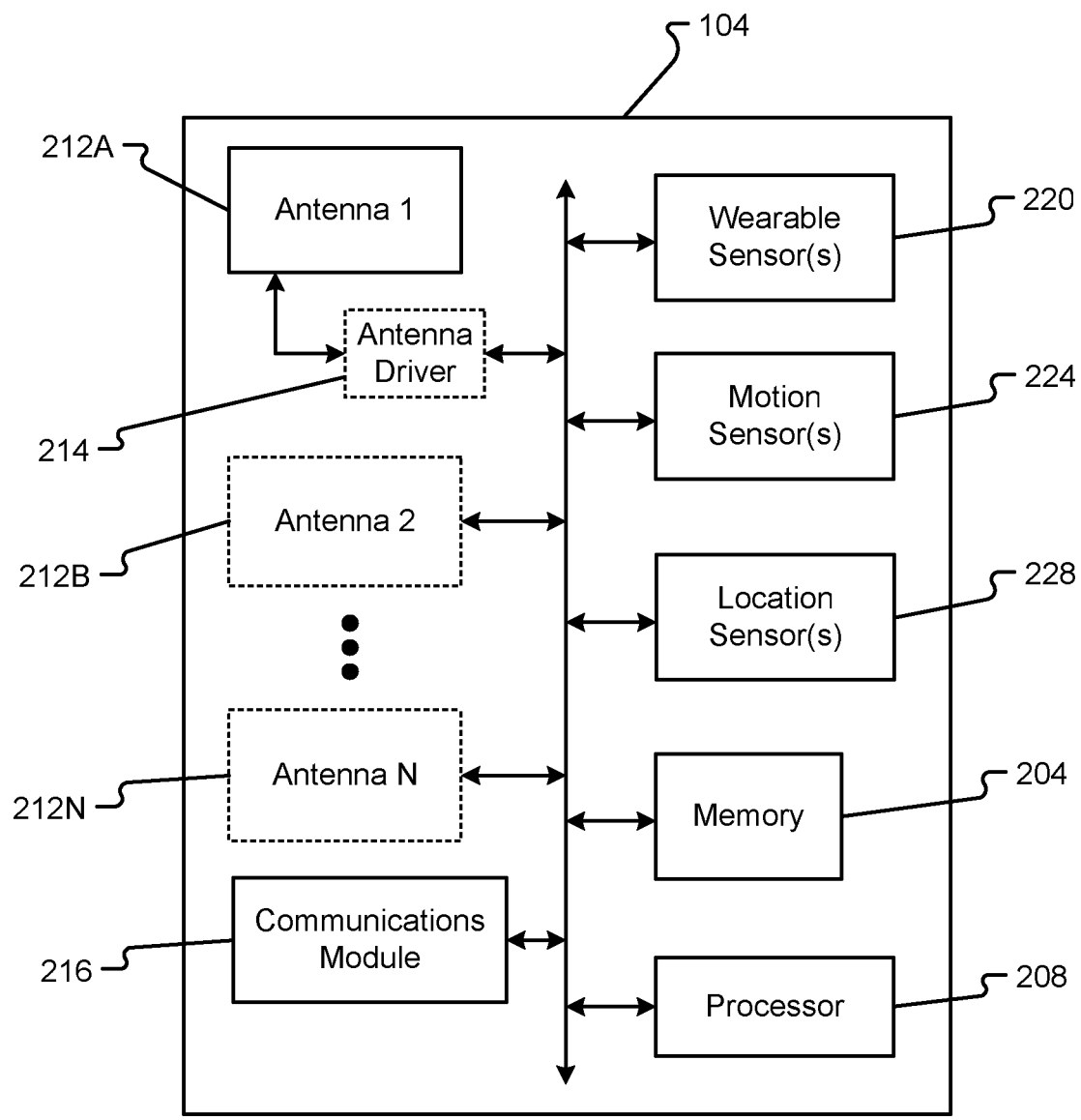
FIG. 2 is a block diagram depicting a wearable device or components thereof in accordance with embodiments of the present disclosure.

Referring now to FIG. 2, a block diagram depicting a wearable device 104 is shown in accordance with embodiments of the present disclosure. The wearable device 104 may include one or more components, such as, a memory 204, a processor 208, an antenna 212A-N, a communications module 216, a wearable sensor 220, a motion sensor 224, and a location sensor 228. In some embodiments, the wearable device 104 may further include a power module. The processor 208 may be an application specific integrated circuit (ASIC), microprocessor, programmable controller, or the like.

The memory 204 of the wearable device 104 may be used in connection with the execution of application programming or instructions by the processor 208, and for the temporary or long term storage of program instructions and/or data. The memory 204 may contain executable functions that are used by the processor 208 to run other components of the wearable device 104. In one embodiment, the memory 204 may be configured to store credential information. For instance, the credential information may include, but is not limited to, unique identifications, manufacturer identification, passwords, keys, encryption schemes, transmission protocols, and the like. As examples, the memory 204 may comprise RAM, DRAM, SDRAM, or other solid state memory.

The one or more antennas 212A-N may be configured to enable wireless communications between the wearable device 104 and a reading device 112 and/or mobile device 108. As can be appreciated, the antenna(s) 212A-N may be arranged to operate using one or more wireless communication protocols and operating frequencies including, but not limited to, Bluetooth®, NFC, Zig-Bee, GSM, CDMA, WiFi, RF, and the like. By way of example, the antenna(s) 212A-N may be RF antenna(s), and as such, may transmit RF signals through free-space to be received by a reading device 112 having an RF transceiver.

In some embodiments, the wearable device 104 may include a power module. The power module may be configured to provide power to the parts of the wearable device 104 in order to operate. The power module may store power in a capacitor of the power module. In one embodiment, electronics in the power module may store energy in the capacitor and turn off when an RF field is present. This arrangement can ensure that energy is presented to the wearable device 104 minimizing any effect on read distance. Although the wearable device 104 may be configured to receive power passively from an electrical field of a reading device 112, it should be appreciated that the wearable device 104 may provide its own power. For example, the power module may include a battery or other power source to supply power to parts of the wearable device 104.

The wearable device 104 may include a communications module 216 that is configured to communicate with one or more different systems or devices either remotely or locally to the wearable device 104. Thus, the communications module 216 can send or receive messages from other wearable devices 104, from mobile devices 108, from reading devices 112, from communication devices 124, from access servers 120, from access control systems, or from other systems. In some embodiments, the communicated information may be provided to, or exchanged with, other components within the wearable device 104.

Embodiments of the wearable device 104 may include at least one wearable sensor 220. Among other things, the wearable sensor 220 may be configured to detect an attachment and/or detachment of the wearable to a user 102. For instance, a wearable device 104 may include a clasp that is required to be opened in attaching and/or removing the wearable from a user 102 (e.g., similar to a clasp of a watch band, bracelet, earring, necklace, etc.). The actuation of the clasp may be detected by a wearable sensor 220 of the wearable device 104. Examples of other wearable sensors 220 may include, but are in no way limited to, contact sensors, switches, proximity sensors, etc., and/or combinations thereof.

In some embodiments, the wearable device 104 may employ one or more sensors 220, 224, 228 that are configured to detect information corresponding to a state of the wearable device 104. The wearable sensors 220 may include, but are not limited to, one or more biometric sensors (e.g., heart rate, body temperature and/or heat signature, blood pressure, etc.), capacitive sensors, light sensors, temperature sensors, pressure sensors, contact sensors, combinations thereof, and the like. It is an aspect of the present disclosure that the processor 208 of the wearable device 104 may receive the sensor information and determine whether the wearable device 104 is being worn by a user 102, whether the wearable device 104 has been removed from a user 102, whether any interruption to the wearing of the wearable device 104 is detected (e.g., whether the wearable device 104 has been continuously worn by, and/or removed from, a user 102, timing associated therewith, etc.). By way of example, the biometric sensor of the wearable sensors 220 may detect biometric characteristics associated with a user 102 wearing the wearable device 104 (e.g., a heart rate, a blood pressure, a body temperature, skin contact data, etc.). The biometric characteristics may be used to determine a state of the wearable device 104 (e.g., being worn or not, etc.) and/or determine an identity of a user 102 wearing the wearable device 104 (e.g., via comparing collected biometric characteristics to baseline characteristics stored in a memory and associated with the user 102, etc.).

The motion sensors 224 may include one or more of a gyroscope, accelerometer, transducer, and/or other mechanical detection component that are each configured to detect a force and/or motion associated with the wearable device 104. This detected motion of the wearable device 104 may be compared, via the processor 208 of the wearable device 104, to known motion profiles stored in the memory 204 or other associated memory in determining a state of the wearable device 104. For instance, a particular motion of the wearable device 104 may indicate that the wearable device 104 is being worn by a user 102. In one embodiment, the detected motion of a wearable device 104 may be compared to the detected motion of an associated mobile device 108, or vice versa, to generate comparison results. The association of the mobile device 108 may be between the wearable device 104 and/or between a user 102 having the wearable device 104. In any event, the comparison results may indicate similarities between the motion of the wearable device 104 and a motion of the mobile device 108 over time. Similar motion comparison results between the wearable device 104 and the mobile device 108 may allow a continuous authentication for the user 102. Dissimilar motion comparison results between the wearable device 104 and the mobile device 108 may be used to disable or discontinue the continuous authentication for the user 102. In one embodiment, an extreme motion detected at one device (e.g., the wearable device 104 or the mobile device 108) but not the other device may cause continuous authentication to be broken, discontinued, and/or disallowed.

The wearable device 104 may include one or more location sensors 228. The location sensors may be configured to determine a geographical location and/or position of the wearable device 104. In one embodiment, this location may be based on Global Positioning System (GPS) data provided by a GPS module of the wearable device 104. In some embodiments, the location of the wearable device 104 may be provided based on cell tower data, WiFi information, iBeacon information, and/or some other location information provided by a location module and/or a communications module 216 of the wearable device 104. The location of a mobile device 108 may be determined in a similar, if not identical, manner as determining the location of the wearable device 104. In some embodiments, the continuous authentication of a user 102 may be based on determining a difference, or distance, between the location of the wearable device 104 and the location of the mobile device 108. For example, once the distance passes a specific threshold value, the continuous authentication may be disabled, discontinued, and/or keys (e.g., credential and/or access control keys, etc.) may be revoked.

Figure 3:
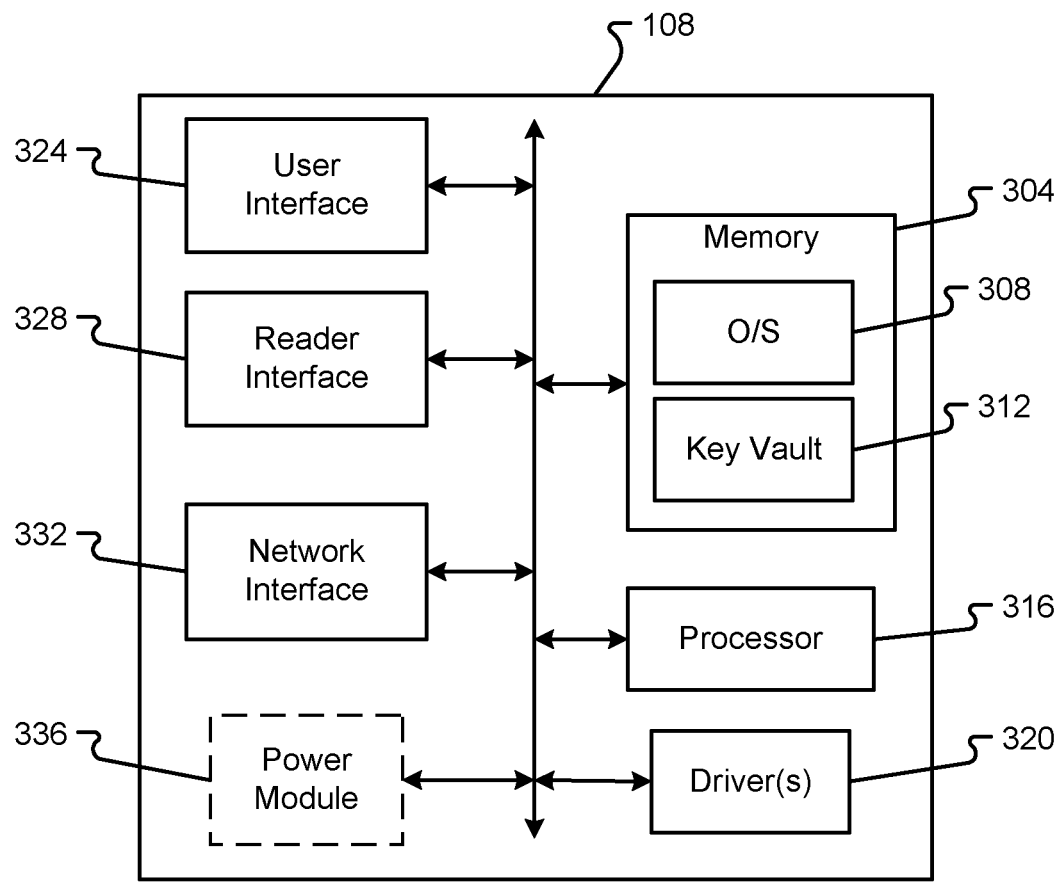
FIG. 3 is a block diagram depicting a mobile device or components thereof in accordance with embodiments of the present disclosure

FIG. 3 shows a block diagram depicting a mobile device 108 in accordance with embodiments of the present disclosure. The mobile device 108 may correspond to any type of electronic device and, as the name suggests, the electronic device may be portable in nature. As some examples, the mobile device 108 may correspond to a cellular phone or smartphone carried by a user. Other examples of a mobile device 108 include, without limitation, wearable devices (e.g., glasses, watches, shoes, clothes, jewelry, wristbands, stickers, etc.). The mobile device 108, as shown in FIGS. 1 and 3, may be provided with a key vault 312 that stores one or a plurality of keys. The key(s) may be communicated to a reader 112 in connection with a holder of the mobile device 108 attempting to gain access to an asset protected by the reader 112. As an example, the mobile device 108 may be presented to the reader 112 by a user 102 or holder of the mobile device 108.

If NFC is being used for the communication channel, then the reader 112 and mobile device 108 may have their interfaces/antennas inductively coupled to one another at which point the reader and/or mobile device 108 will authenticate or mutually authenticate with one another. Following authentication, the reader 112 may request a key or multiple keys from the mobile device 108, or the mobile device 108 may offer a key or multiple keys to the reader 112. Upon receiving the key(s) from the mobile device 108, the reader 112 may analyze the key(s) and determine if the key(s) are valid and, if so, allow the holder/user of the mobile device 108 access to the asset protected by the reader 112. It should be appreciated that the mobile device 108 may alternatively or additionally be configured to analyze information received from the reader 112 in connection with making an access control decision and/or in connection with making a decision whether or not to provide key(s) to the reader 112. Examples of technologies that can be used by the mobile device 108 to make an access control decision for itself are further described in U.S. Pat. No. 8,074,271 to Davis et al. and U.S. Pat. No. 7,706,778 to Lowe, both of which are hereby incorporated herein by reference in their entirety.

If BLE or some other non-inductive protocol (e.g., Wi-Fi) is being used for the communication channel, then the reader 112 and mobile device 108 may perform a discovery routine prior to pairing with one another or otherwise connecting to establish the communication channel. After the channel is established, however, the reader 112 and mobile device 108 may then authenticate one another and exchange relevant information, such as the key(s), to enable an access control decision to be made. If a positive access control decision is made (e.g., it is determined that the key(s) are valid and the mobile device 108 is allowed to access the asset protected by the reader 112), then the reader 112 may initiate one or more actions to enable the holder/user 102 of the mobile device 108 to access the asset protected by the reader 112.

The mobile device 108 is shown to include computer memory 304 that stores one or more Operating Systems (O/S) 308 and a key vault 312, among other items. The mobile device 108 is also shown to include a processor 316, one or more drivers 320, a user interface 324, a reader interface 328, a network interface 332, and a power module 336. Suitable examples of a mobile device 108 include, without limitation, smart phones, PDAs, laptops, PCs, tablets, netbooks, wearable devices, and the like.

The memory 304 may correspond to any type of non-transitory computer-readable medium. In some embodiments, the memory 304 may comprise volatile or non-volatile memory and a controller for the same. Non-limiting examples of memory 304 that may be utilized in the mobile device 108 include RAM, ROM, buffer memory, flash memory, solid-state memory, or variants thereof.

The O/S 308 may correspond to one or multiple operating systems. The nature of the O/S 308 may depend upon the hardware of the mobile device 108 and the form factor of the mobile device 108. The O/S 308 may be viewed as an application stored in memory 304 that is processor-executable. The O/S 308 is a particular type of general-purpose application that enables other applications stored in memory 304 (e.g., a browser, an email application, an SMS application, etc.) to leverage the various hardware components and driver(s) 320 of the mobile device 108. In some embodiments, the O/S 308 may comprise one or more APIs that facilitate an application's interaction with certain hardware components of the mobile device 108. Furthermore, the O/S 308 may provide a mechanism for viewing and accessing the various applications stored in memory 304 and other data stored in memory 304.

The processor 316 may correspond to one or many microprocessors that are contained within the housing of the mobile device 108 with the memory 304. In some embodiments, the processor 316 incorporates the functions of the user device's Central Processing Unit (CPU) on a single Integrated Circuit (IC) or a few IC chips. The processor 316 may be a multipurpose, programmable device that accepts digital data as input, processes the digital data according to instructions stored in its internal memory, and provides results as output. The processor 316 implement sequential digital logic as it has internal memory. As with most known microprocessors, the processor 316 may operate on numbers and symbols represented in the binary numeral system.

The driver(s) 320 may correspond to hardware, software, and/or controllers that provide specific instructions to hardware components of the mobile device 108, thereby facilitating their operation. For instance, the user interface 324, reader interface 328, and network interface 332, may each have a dedicated driver 320 that provides appropriate control signals to effect their operation. The driver(s) 320 may also comprise the software or logic circuits that ensure the various hardware components are controlled appropriately and in accordance with desired protocols. For instance, the driver 320 of the reader interface 328 may be adapted to ensure that the reader interface 328 follows the appropriate proximity-based protocols (e.g., BLE, NFC, Infrared, Ultrasonic, IEEE 802.11N, etc.) such that the reader interface 328 can exchange communications with the credential. Likewise, the driver 320 of the network interface 332 may be adapted to ensure that the network interface 332 follows the appropriate network communication protocols (e.g., TCP/IP (at one or more layers in the OSI model), UDP, RTP, GSM, LTE, Wi-Fi, etc.) such that the network interface 332 can exchange communications via the communication network 128. As can be appreciated, the driver(s) 320 may also be configured to control wired hardware components (e.g., a USB driver, an Ethernet driver, etc.).

As mentioned above, the user interface 324 may comprise one or more user input devices and/or one or more user output devices. Examples of suitable user input devices that may be included in the user interface 324 include, without limitation, buttons, keyboards, mouse, touch-sensitive surfaces, pen, camera, microphone, etc. Examples of suitable user output devices that may be included in the user interface 324 include, without limitation, display screens, touchscreens, lights, speakers, etc. It should be appreciated that the user interface 324 may also include a combined user input and user output device, such as a touch-sensitive display or the like.

The reader interface 328 may correspond to the hardware that facilitates communications with the credential for the mobile device 108. The reader interface 328 may include a Bluetooth interface (e.g., antenna and associated circuitry), a Wi-Fi/802.11N interface (e.g., an antenna and associated circuitry), an NFC interface (e.g., an antenna and associated circuitry), an Infrared interface (e.g., LED, photodiode, and associated circuitry), and/or an Ultrasonic interface (e.g., speaker, microphone, and associated circuitry). In some embodiments, the reader interface 328 is specifically provided to facilitate proximity-based communications with a credential via communication channel or multiple communication channels.

The network interface 332 may comprise hardware that facilitates communications with other communication devices over the communication network 128. As mentioned above, the network interface 332 may include an Ethernet port, a Wi-Fi card, a Network Interface Card (NIC), a cellular interface (e.g., antenna, filters, and associated circuitry), or the like. The network interface 332 may be configured to facilitate a connection between the mobile device 108 and the communication network 128 and may further be configured to encode and decode communications (e.g., packets) according to a protocol utilized by the communication network 128.

The power module 336 may include a built-in power supply (e.g., battery) and/or a power converter that facilitates the conversion of externally-supplied AC power into DC power that is used to power the various components of the mobile device 108. In some embodiments, the power module 336 may also include some implementation of surge protection circuitry to protect the components of the mobile device 108 from power surges.

Figure 4:
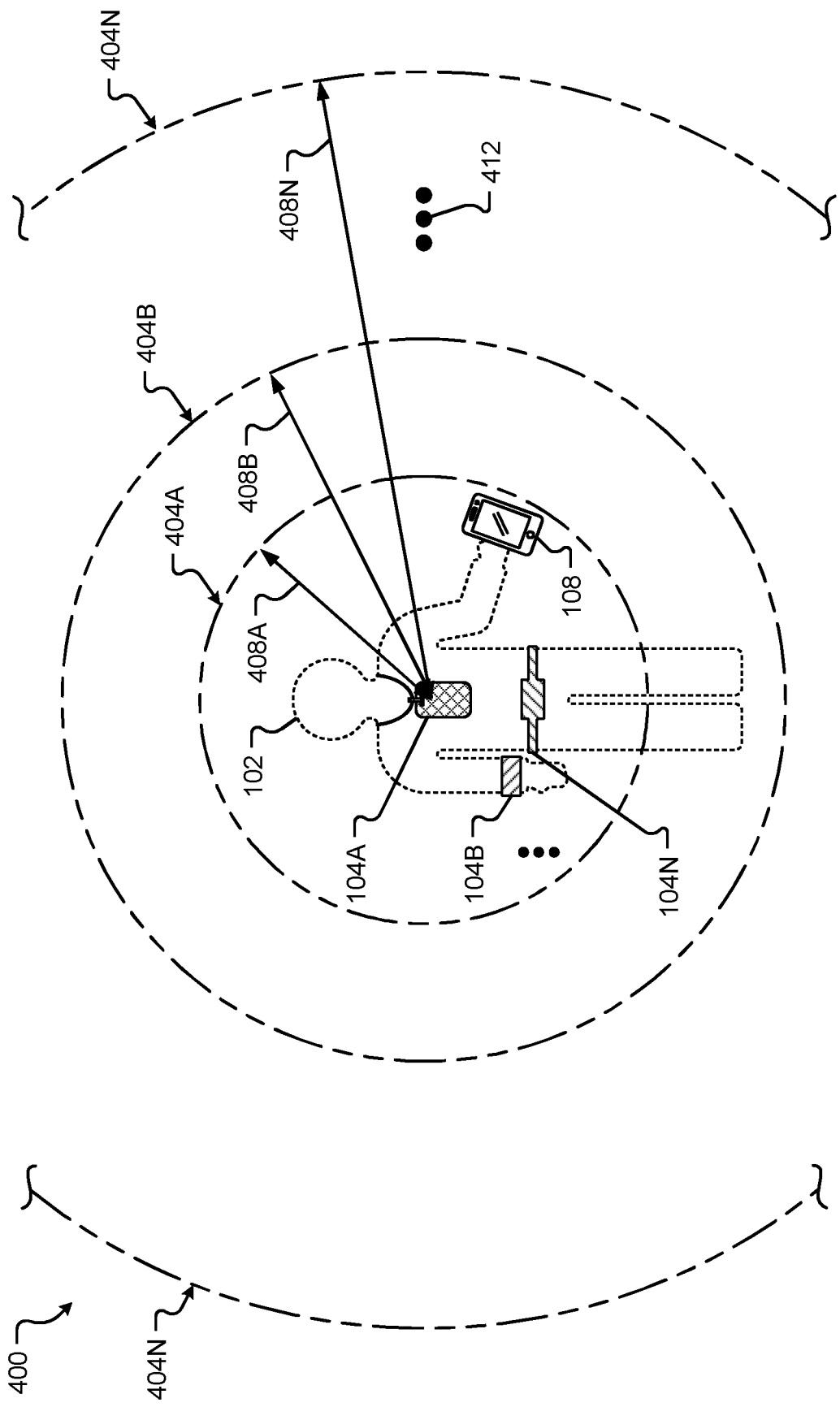
FIG. 4 is a block diagram depicting an operational environment of a wearable device and a mobile device in accordance with embodiments of the present disclosure.

FIG. 4 is a block diagram depicting an operational environment 400 of a wearable device 104 and a mobile device 108 in accordance with embodiments of the present disclosure. In particular, FIG. 4 shows various zones 404A-N of distances 408A-N ranging from a wearable device 104 of a user 102. It should be appreciated that the zones 404A-N may be based on a position of any of the wearable devices 104A-N and/or the mobile device 108. Although described in conjunction with the wearable device 104, the zones 404A-N may be based on a position of the mobile device 108. As shown, the first zone 404A represents a first area or volume (symmetric or asymmetric) around the wearable device 104 that is defined by a specific first distance 408A from the wearable device 104. In some embodiments, this first zone 404A may represent a three-dimensional (3D) volume (e.g., a volume that is substantially spherical, cylindrical, or toroidal, etc.) around the wearable device 104A. It should be appreciated that the zones 404A-N may have a center of mass or origin that coincides with an antenna of the wearable device 104, an antenna of the mobile device 108, a location on the user 102, or some combination thereof.

The wearable device 104 and/or the mobile device 108 may be configured to operate in a particular manner based on whether each of the devices 104, 108 are detected within the same zone. For instance, each of the zones 404A-N may be associated with a different level of operability. If, for instance, both the wearable device 104 and the mobile device 108 are detected within the first zone 404A, continuous authentication may be allowed for the user 102 having the wearable device 104. However, if one of the wearable device 104 or the mobile device 108 is detected in a different zone (e.g., wearable device 104 in first zone 404A and mobile device 108 in zone 404B, etc.) the continuous authentication may be disabled. In some embodiments, when one of the devices 104, 108 is detected in an outer zone 404N or some other zone 412, an alert (e.g., audible, visual, tactile, etc., or combinations thereof) may be provided to the user 102 (e.g., via the wearable device 104, a communication device 124, and/or the mobile device 108, etc.). The alert may be configured to inform the user 102 that the device 104, 108 is separated from the user 102 by at least a significant distance 408N, etc.

Figure 5A:
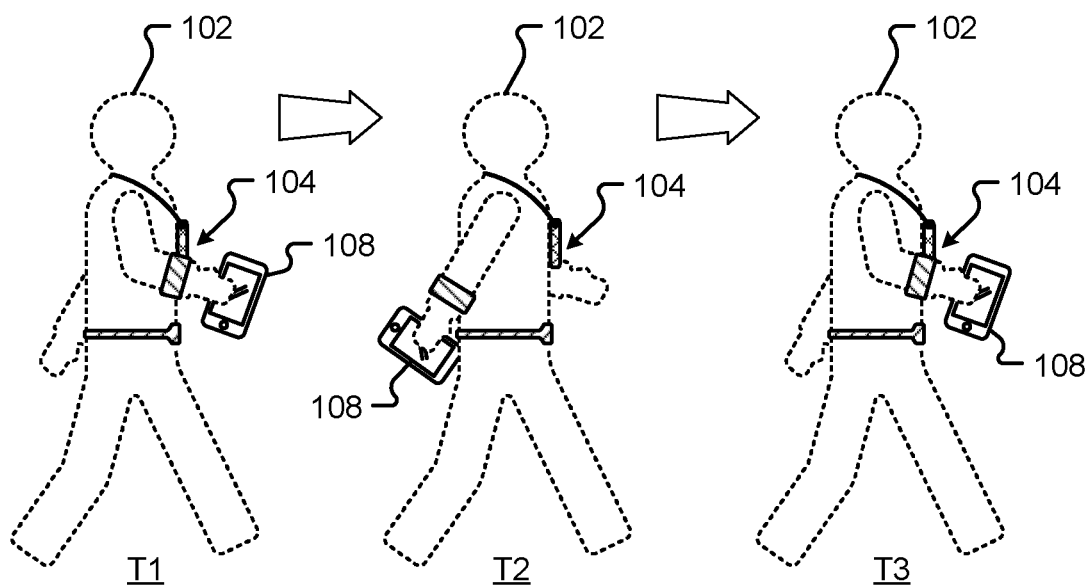
FIG. 5A is a diagram depicting a user associated with a wearable and mobile device moving in an environment in accordance with embodiments of the present disclosure.
Figure 5B:
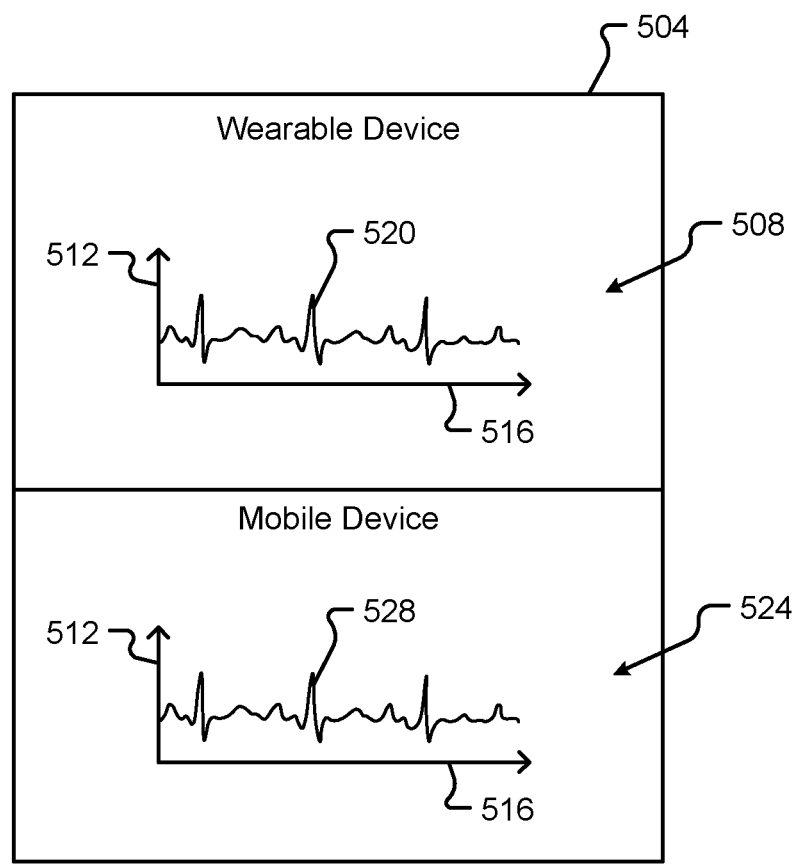
FIG. 5B is a diagram of a movement intensity and time measurement graph for the wearable and mobile device associated with the user in FIG. 5A in accordance with embodiments of the present disclosure.

FIGS. 5A and 5B show diagrams representing a user 102 associated with a wearable and mobile device 104, 108 moving in an environment in accordance with embodiments of the present disclosure. As the user 102 moves in the environment, an intensity associated with the movement may be determined by the wearable device 104 and/or the mobile device 108. The movement intensity may be used to determine one or more of a cadence, rhythm, pace, movement type (e.g., running, jogging, walking, traveling via a conveyance, etc.), gait (e.g., movement style, signature, etc.), and/or any aspects, especially unique characteristics, associated therewith, etc. Movement intensity may be detected, determined, and/or measured by one or more of the sensors associated with each device 104, 108. For instance, a movement intensity may be determined from the wearable sensors 220, motion sensors 224, location sensors 228, and/or using any movement information provided by any other sensor or sensors associated with the wearable device 104. In some embodiments, the movement intensity may be determined from similar sensors that are associated with the mobile device 108.

FIG. 5A shows a user 102 moving at three different points in time (e.g., T1, T2, and T3). The user 102 is shown wearing at least one wearable device 104 while carrying a mobile device 108. In some embodiments, the mobile device 108 may be carried, or otherwise toted, by the user 102 in a pocket, pouch, purse, bag, case, or other item of clothing and/or accessory. Movement of the user 102 (e.g., in the form of steps, impact, movement type, etc.) may be detected by various sensors associated by the wearable device 104 and the mobile device 108. The motion and/or motion intensity detected by each device may be recorded over time.

Referring to FIG. 5B, a diagram of a graphical user interface 504 is shown including a first motion intensity portion 508 and a second motion intensity portion 524. The first motion intensity portion 508 may be associated with a motion intensity detected via the wearable device 104 over time. The second motion intensity portion 524 may be associated with a motion intensity detected via the mobile device 108 over time. In any event, each portion 508, 524 includes a measured motion intensity over time graph 520, 528 including a motion intensity axis 512 and a time axis 516. The motion intensity graph 520 for the wearable device 104 may include information corresponds to a movement of the user 102 at the three different points in time (e.g., T1, T2, and T3) described in conjunction with FIG. 5A. As shown in the motion intensity graph 520 for the wearable device 104, three peaks in motion intensity are detected over time. Each of these peaks may be associated with a step taken by the user 102. Similarly, the motion intensity graph 528 for the mobile device 108 illustrate three peaks in motion intensity that are detected over time. In one embodiment, for example when the motion intensity graph 520 for the wearable device 104 matches, or substantially matches, the motion intensity graph 528 for the mobile device 108 the devices 104, 108 may be presumed to be carried, worn, or otherwise associated with the user 102. In this case, a continuous authentication for the user 102 may be maintained. By way of example, the wearable device 104 may determine that the motion intensity measured for each device 104, 108 match (e.g., are similar, substantially similar, or similar in a particular variation, range, and/or threshold, etc.) and therefore the authentication associated with the wearable device 104 may continue.

Figure 6A:
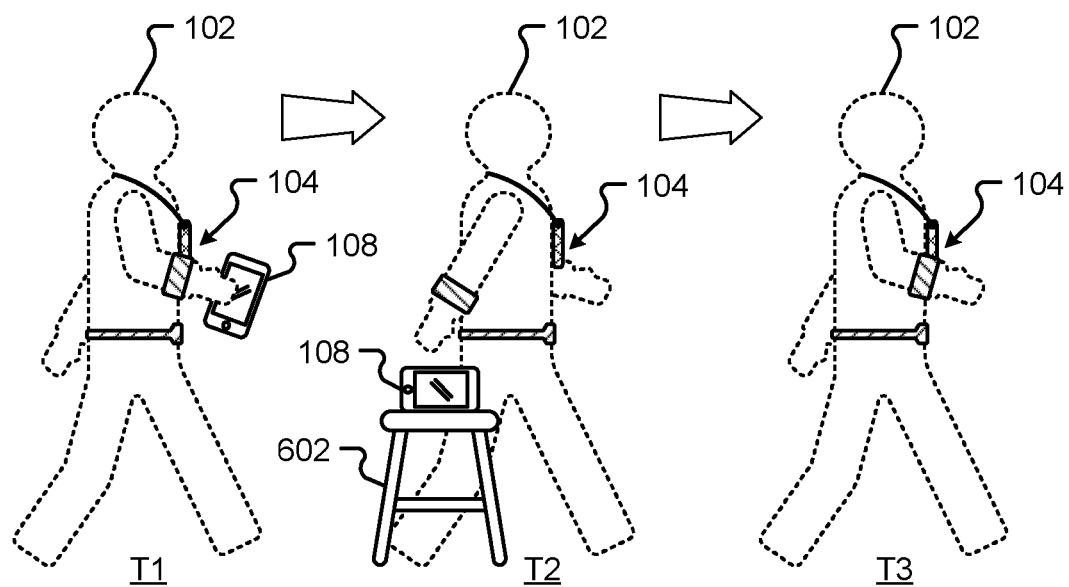
FIG. 6A is a diagram depicting a user associated with a wearable and mobile device moving in an environment in accordance with embodiments of the present disclosure.
Figure 6B:
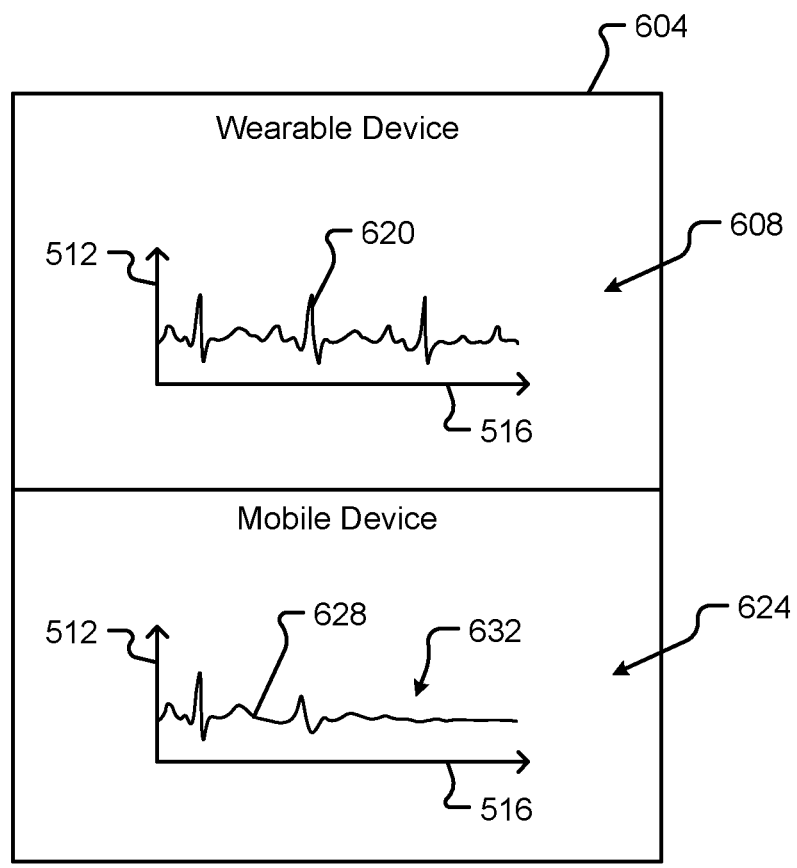
FIG. 6B is a diagram of a movement intensity and time measurement graph for the wearable and mobile device associated with the user in FIG. 6A in accordance with embodiments of the present disclosure.

FIGS. 6A and 6B show diagrams representing a user 102 associated with a wearable and mobile device 104, 108 moving in an environment in accordance with embodiments of the present disclosure. As the user 102 moves in the environment, an intensity associated with the movement may be determined by the wearable device 104 and/or the mobile device 108. As described above, the movement intensity may be used to determine one or more of a cadence, rhythm, pace, movement type, gait, and/or any aspects, especially unique characteristics, associated therewith, etc. Movement intensity may be detected, determined, and/or measured by one or more of the sensors associated with each device 104, 108. For instance, a movement intensity may be determined from the wearable sensors 220, motion sensors 224, location sensors 228, and/or using any movement information provided by any other sensor or sensors associated with the wearable device 104. In some embodiments, the movement intensity may be determined from similar sensors that are associated with the mobile device 108.

FIG. 6A shows a user 102 moving at three different points in time (e.g., T1, T2, and T3). The user 102 is shown wearing at least one wearable device 104 while carrying a mobile device 108 at a first point in time, T1. In some embodiments, the mobile device 108 may be carried, or otherwise toted, by the user 102 in a pocket, pouch, purse, bag, case, or other item of clothing and/or accessory. Movement of the user 102 (e.g., in the form of steps, impact, movement type, etc.) may be detected by various sensors associated by the wearable device 104 and the mobile device 108. The motion and/or motion intensity detected by each device may be recorded over time. As the user 102 moves at a second point in time, T2, the mobile device 108 is shown disassociated from the user 102. For instance, the mobile device 108 may be misplaced, lost, left behind, set on a table, given to another user, and/or otherwise not carried by the user 102. Moving at a third point in time, T3, FIG. 6A shows the user 102 with the at least one wearable device but without the mobile device 108.

Referring to FIG. 6B, a diagram of a graphical user interface 604 is shown including a first motion intensity portion 608 and a second motion intensity portion 624. The first motion intensity portion 608 may be associated with a motion intensity detected via the wearable device 104 over time. The second motion intensity portion 624 may be associated with a motion intensity detected via the mobile device 108 over time. In any event, each portion 608, 624 includes a measured motion intensity over time graph 620, 628 including a motion intensity axis 512 and a time axis 516. The motion intensity graph 620 for the wearable device 104 may include information corresponds to a movement of the user 102 at the three different points in time (e.g., T1, T2, and T3) described in conjunction with FIG. 6A. As shown in the motion intensity graph 520 for the wearable device 104, three peaks in motion intensity are detected over time. Each of these peaks may be associated with a step taken by the user 102.

In contrast, the motion intensity graph 628 for the mobile device 108 illustrates different motion intensity readings that are detected over time. As provided above, when the motion intensity graph 620 for the wearable device 104 matches, or substantially matches, the motion intensity graph 628 for the mobile device 108 the devices 104, 108 may be presumed to be carried, worn, or otherwise associated with the user 102 and a continuous authentication for the user 102 may be maintained. However, and as illustrated in FIGS. 6A and 6B, the motion intensity measured for the wearable device 104 differs from the motion intensity measured for the mobile device 108 over time. As shown in FIG. 6B, each graph 620, 628 includes a similar first portion (e.g., at the time, T1, when the wearable device 104 and the mobile device 108 were both being carried by the user 102, etc.). When the user 102 no longer carries the mobile device 108 (e.g., at time T2), however, the motion intensities measured for each device 104, 108 over time change or are different (i.e., the motion intensities no longer match). In fact, the motion intensity associated with the mobile device 108 records a reduced intensity 632 when compared to the motion intensity of the wearable device 104. For example, the lack of motion intensity or a reduced motion intensity may indicate that the mobile device 108 is still or unmoving (e.g., on a static surface, object, table, stool, etc.). Because the motion intensity graphs 620, 628 are different, or substantially different (e.g., are dissimilar, substantially dissimilar, or beyond similarity in a particular variation, range, and/or threshold, etc.) a continuous authentication associated with the wearable device 104 may be terminated or discontinued. In any of the embodiments described herein, the authentication may be maintained/continued and/or terminated/discontinued by the wearable device 104 in response to the wearable device 104 determining whether the motion intensities are similar or dissimilar, respectively. It should be appreciated, that in all the embodiments described herein, the access credentials for the wearable device 104 may be the only credentials necessary to allow access decisions to be granted. The access credentials may only be allowed to continue to be valid, based on particular states or conditions. Continuous authentication allows the wearable device 104 to continue to provide authentication (e.g., via the access credentials, etc.) unless the access credentials are removed, edited, altered, or otherwise restricted based on the state.

In some embodiments, determining a difference between the motion intensity of the wearable device 104 and the mobile device 108 may be determined in real-time and or near-real-time. For instance, the difference in motion intensity may be determined as a particular device experiences a motion and/or a lack of motion. In one embodiment, an algorithm may compare motion signals (e.g., including motion, a lack of motion, and/or an intensity associated therewith, etc.) in real-time. This approach may require a time synchronization of the signals. In any event, the signals may be checked for a correlation factor. Among other things, the correlation factor may indicate whether a motion signal from a first device correlates to a motion signal from a second device. In the event that the correlation factor falls under a certain threshold value for some period of time (e.g., indicating a dissimilarity in motion detected at one or more devices, etc.), a device (e.g., the wearable device 104, etc.) may determine that the wearable device 104 and the mobile device 108 have been separated in some way. In this embodiment, the authentication of one or more of the devices (e.g., the wearable device 104, etc.) may be disabled. In the event that the correlation factor returns above the threshold value, or in an acceptable correlation range, the authentication may re-enable. Additionally or alternatively, when the correlation factor returns above the threshold value, or in an acceptable correlation range, the authentication may re-enable only after a user has entered or provided a second factor authentication, code, or authorization, etc. At least one benefit to this approach includes a motion-agnostic analysis performed by a device. In other words, it does not matter exactly what motion is being engendered or detected at each device 104, 108, only that the motions are correlated (e.g., by a correlation factor, range, threshold, etc.) in some way to maintain a continuous authentication. This may correspond to observing similarities from a signal perspective. In the context of accelerometer signals, a device may use a standard auto correlation algorithm in the time domain or the frequency domain. In some cases, an artificial intelligence based pattern matching (e.g., a sliding pattern window on the signals, etc.) may be used by a device in determining correlation.

Figure 7:
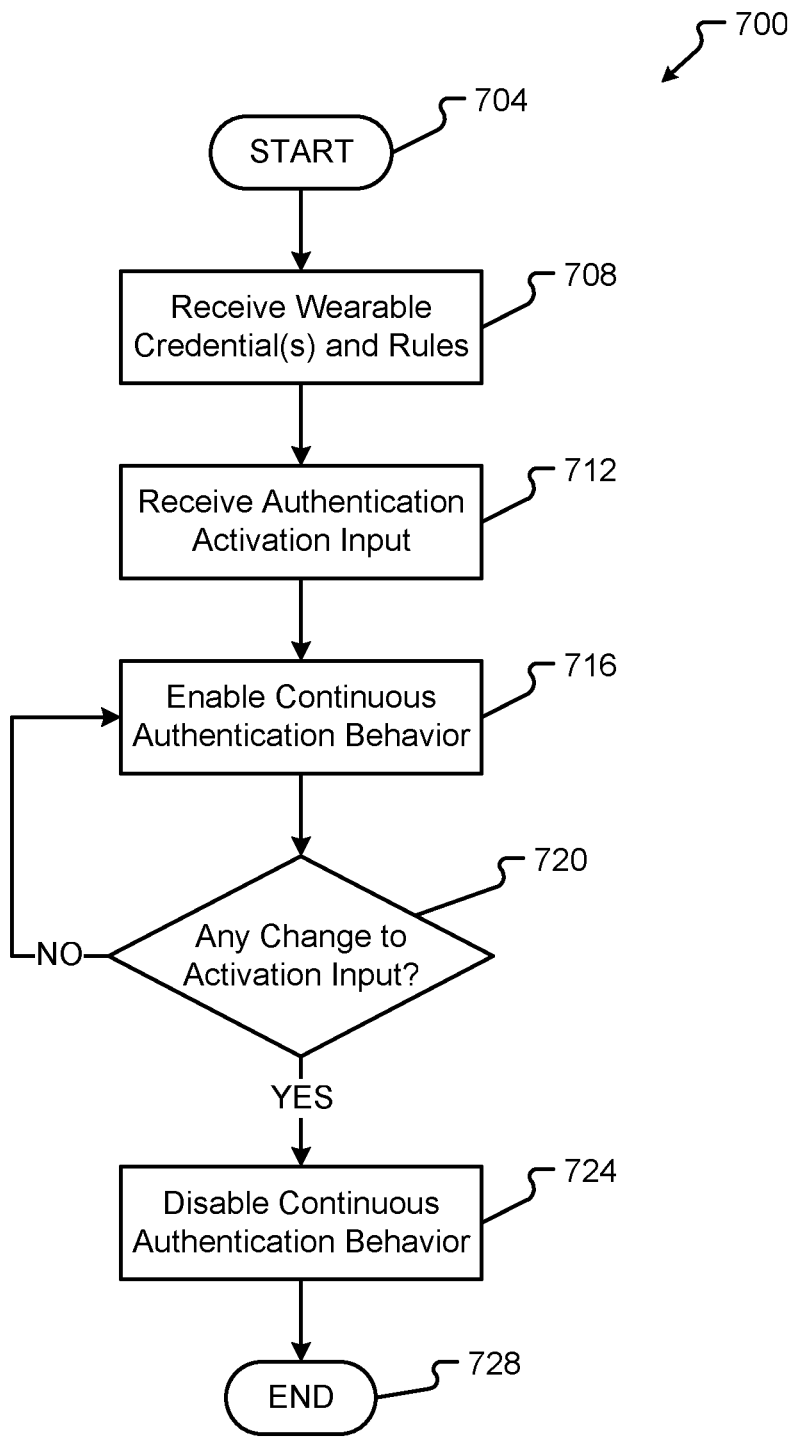
FIG. 7 is a flow chart depicting a method of selectively enabling continuous authentication of a wearable device in accordance with embodiments of the present disclosure.

FIG. 7 is a flow chart depicting a method 700 of selectively enabling continuous authentication of a wearable device 104 in accordance with embodiments of the present disclosure. While a general order for the steps of the method 700 is shown in FIG. 7, the method 700 can include more or fewer steps or can arrange the order of the steps differently than those shown in FIG. 7. Generally, the method 700 starts with a start operation 704 and ends with an end operation 728. The method 700 can be executed as a set of computer-executable instructions executed by a computer system and encoded or stored on a computer readable medium. Hereinafter, the method 700 shall be explained with reference to the systems, components, modules, environments, software, etc. described in conjunction with FIGS. 1-6B.

The method 700 begins at step 704 and proceeds by receiving, at the wearable device 104, wearable credentials and rules from a provisioning authority (step 708). The provisioning authority may correspond to a central system or access control system 100. The rules may be stored in the memory 204 of the wearable device 104.

Next, the method 700 proceeds by receiving an authentication activation input (step 712). This authentication activation input may correspond to information that the wearable device 104 is being worn by a user 102. One example of the authentication activation input may include attaching the wearable device 104 to a user 102 (e.g., via clasping, fastening, etc., the wearable device 104). Another example of the authentication activation input may include determining whether the wearable device 104 is being worn via one or more wearable sensors 220. In yet another example, the authentication activation input may include determining whether the wearable device 104 is paired and/or associated with a trusted mobile device 108. Additionally or alternatively, the authentication activation input may include determining whether a mobile device 108 is associated with, located in proximity to, and/or carried by the user 102.

Upon receiving the authentication activation input, the method 700 may continue by enabling the continuous authentication behavior of the user 102 via the wearable device 104 (step 716). Continuous authentication behavior includes, but is not limited to, automatically providing access credentials and/or keys to one or more reading devices 112 in an access control system 100. In some embodiments, a user 102 having a wearable device 104 with enabled continuous authentication behavior may proceed through one or more access controlled areas of a system without requiring the user 102 to manually present credentials at every access control point. In one embodiment, as long as the continuous authentication of the wearable device 104 is enabled, the user 102 may move freely and quickly through an access controlled environment according to the credentials and rules stored in the memory 204 of the wearable device 104.

The method 700 continues by determining whether there is any change to the authentication activation input (step 720). Changes to the authentication activation input may include, but are not limited to, determining that the wearable device 104 is no longer being worn by a user, or a particular user, that the wearable device 104 has been removed or detached from a user, that the wearable device 104 has unpaired from an associated trusted mobile device 108, that the wearable device 104 and the associated trusted mobile device 108 are located in different geographical locations, etc., that a revocation of credentials signal has been received from a provisioning authority, and/or combinations thereof. If no change in the authentication activation input is determined, the method 700 returns to step 716 allowing the continuous authentication to continue.

In the event that a change in the authentication activation input is determined, the method 700 proceeds to disable continuous authentication behavior associated with the wearable device 104 (724). Disabling the continuous authentication may be provided by the processor 208 of the wearable device 104 executing instructions according to one or more rules stored in the memory 204 of the wearable device 104. In some embodiments, disabling continuous authentication may include deleting credentials, removing keys, suspending authentication for a period of time, conditionally suspending authentication (e.g., until a new authentication activation input is received, etc.), revoking credentials, disabling an operation of the wearable device 104, etc., and/or combinations thereof. The method 700 ends at step 728.

Figure 8:
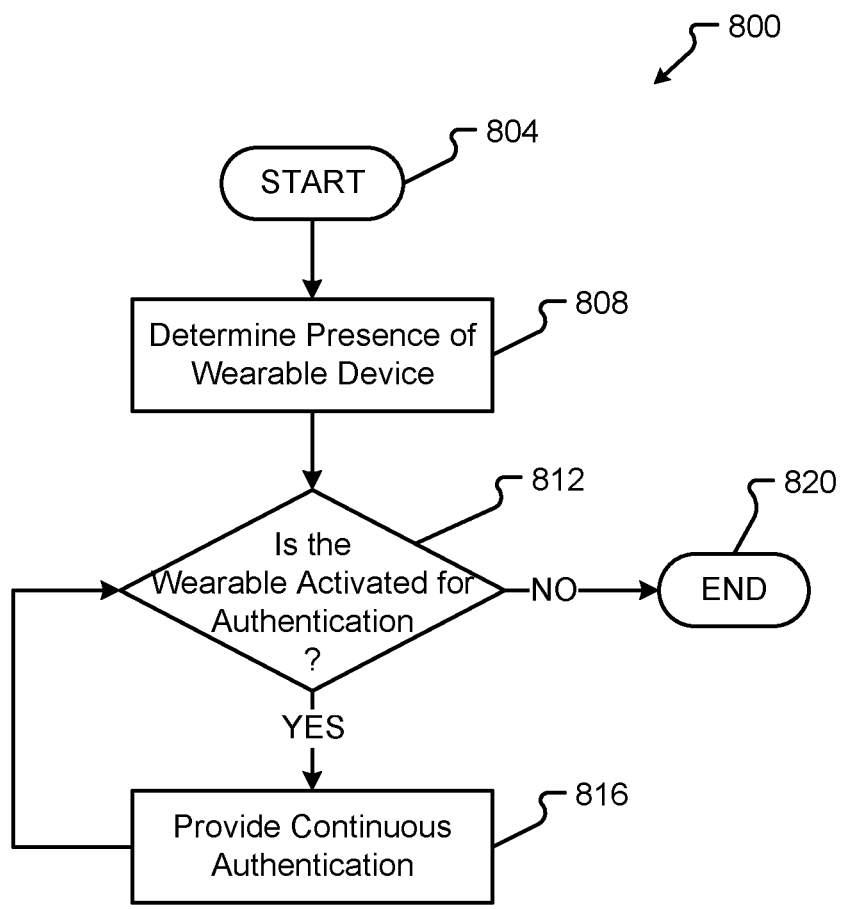
FIG. 8 is a flow chart depicting a method of provisioning continuous authentication for a wearable device in an access control system in accordance with embodiments of the present disclosure.

FIG. 8 is a flow chart depicting a first method of provisioning continuous authentication for a wearable device 104 in an access control system 100 in accordance with embodiments of the present disclosure. While a general order for the steps of the method 800 is shown in FIG. 8, the method 800 can include more or fewer steps or can arrange the order of the steps differently than those shown in FIG. 8. Generally, the method 800 starts with a start operation 804 and ends with an end operation 820. The method 800 can be executed as a set of computer-executable instructions executed by a computer system and encoded or stored on a computer readable medium. Hereinafter, the method 800 shall be explained with reference to the systems, components, modules, environments, software, etc. described in conjunction with FIGS. 1-7.

The method 800 begins at step 804 and proceeds by determining the presence of a wearable device 104 via at least one reading device 112 (step 808). Next, the method 800 determines whether the wearable device 104 is activated for authentication (step 812). If the wearable device 104 is not activated for authentication, or if authentication has been disabled, the method 800 ends at step 820. In the event that the wearable device 104 is activated for authentication, the method 800 proceeds by the reading device 112 providing access based on the continuous authentication for the user 102 having the wearable device 104 (step 816). This access may be based on the rules and/or the credentials stored in the memory 204 of the wearable device 104. The method 800 returns to step 812 and continues to determine whether the wearable device 104 is activated for authentication. As can be appreciated, the authentication of a wearable device 104 in an access control system 100 may be changed based on a number of conditions, as described herein. Among other things, continually determining whether the wearable device 104 is authenticated as a user 102 moves throughout an access control system 100 allows for an immediate detection of unauthenticated credentials.

Figure 9:
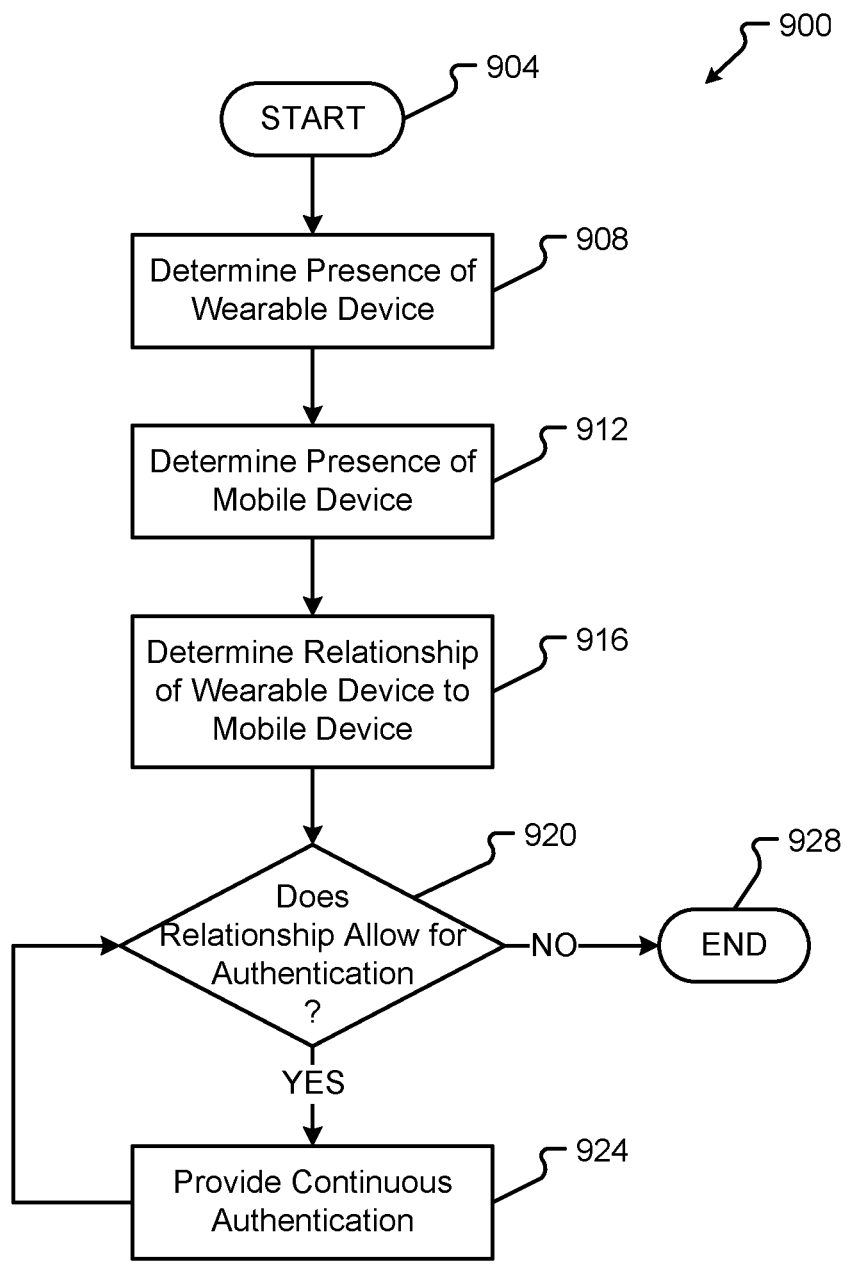
FIG. 9 is a flow chart depicting a method of selectively enabling continuous authentication of a wearable device in accordance with embodiments of the present disclosure.

FIG. 9 is a flow chart depicting a method 900 of selectively enabling continuous authentication of a wearable device 104 in accordance with embodiments of the present disclosure. While a general order for the steps of the method 900 is shown in FIG. 9, the method 900 can include more or fewer steps or can arrange the order of the steps differently than those shown in FIG. 9. Generally, the method 900 starts with a start operation 904 and ends with an end operation 924. The method 900 can be executed as a set of computer-executable instructions executed by a computer system and encoded or stored on a computer readable medium. Hereinafter, the method 900 shall be explained with reference to the systems, components, modules, environments, software, etc. described in conjunction with FIGS. 1-8.

The method 900 begins at step 904 and proceeds by determining the presence of a wearable device 104 (step 908). The method 900 may determine the presence of a mobile device (step 912). Next, the method 900 determines whether a relationship of the wearable device 104 to the mobile device 108 allows for continuous authentication (step 916). The relationship may correspond to a pairing between the devices 104, 108, a geographical distance between the devices 104, 108, a motion relationship of each device 104, 108, an identity association shared between the devices 104, 108 (e.g., detecting an identification of a user 102 recorded on each device 104, 108, etc.), and/or some other relationship between the devices 104, 108.

In the event that the relationship does not allow for continuous authentication, the method 900 ends at step 928. In this case, no authentication would be provided for the wearable device 104 in an access control system 100.

When the relationship of the wearable device 104 to the mobile device 108 allows for continuous authentication, the method 900 proceeds by providing access authentication credentials based on the continuous authentication for the user 102 having the wearable device 104. In some embodiments, this authentication may allow access to a user 102 having the wearable device 104 based on the rules and/or the credentials stored in the memory 204 of the wearable device 104. The method 900 may continue by returning to step 920 and continually determining whether the relationship between the wearable device 104 and the mobile device 108 allows continuous authentication. As described herein, the relationship between the wearable device 104 and the mobile device 108 may change over time, in the event of theft, in the event of a lost device 104, 108, etc. Continually reevaluating the relationship between the wearable device 104 and the mobile device 108 can provide for fast detection of credential misuse, loss, or theft.

The exemplary systems and methods of this disclosure have been described in relation to wearable devices, systems, and methods in an access control system. However, to avoid unnecessarily obscuring the present disclosure, the preceding description omits a number of known structures and devices. This omission is not to be construed as a limitation of the scopes of the claims. Specific details are set forth to provide an understanding of the present disclosure. It should, however, be appreciated that the present disclosure may be practiced in a variety of ways beyond the specific detail set forth herein. Moreover, it should be appreciated that the methods disclosed herein may be executed via a wearable device, a mobile device, a reading device, a communication device, and/or an access server of an access control system, etc.

Furthermore, while the exemplary aspects, embodiments, options, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a Personal Computer (PC), laptop, netbook, smart phone, Personal Digital Assistant (PDA), tablet, etc., or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

Optionally, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and/or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

Embodiments include a method, comprising: receiving, via one or more sensors of a wearable device, information corresponding to a state of a wearable device; determining, based on rules stored in a memory, whether the state of the wearable device allows for authentication credentials associated with the wearable device to be enabled; and disabling the authentication credentials when the state of the wearable device restricts the authentication credentials.

Aspects of the above method include wherein the state of the wearable device indicates that the wearable device is being worn by a user and thereby enabling the authentication credentials to continue to be enabled. Aspects of the above method include wherein the state of the wearable device indicates that the wearable device has been removed from a user and thereby disabling the authentication credentials and continuous authentication. Aspects of the above method include wherein prior to determining whether the state of the wearable device allows for authentication credentials associated with the wearable device to be enabled, the method further comprises: receiving, via one or more sensors of the wearable device, information corresponding to a state of a mobile device associated with the wearable. Aspects of the above method include wherein determining whether the state of the wearable device allows for authentication credentials associated with the wearable device to be enabled further comprises: determining a relationship between the wearable device and the mobile device. Aspects of the above method include wherein the authentication credentials are disabled when the relationship between the wearable device and the mobile device indicates that the wearable device is located apart from the mobile device. Aspects of the above method further comprise: determining, via a processor, that a motion intensity of the wearable device does not match a motion intensity of the mobile device based on motion rules stored in the memory; and continuing disablement of, via the processor and in response to determining that the motion intensity of the wearable device does not match the motion intensity of the mobile device, the authentication credentials for the wearable device. Aspects of the above method further comprise: determining, via a processor, that a motion intensity of the wearable device matches a motion intensity of the mobile device based on motion rules stored in the memory; and re-enabling, via the processor and in response to determining that the motion intensity of the wearable device matches the motion intensity of the mobile device, the enabled authentication credentials for the wearable device. Aspects of the above method further include wherein the motion intensity of the wearable device corresponds to an intensity of movement associated with the wearable device recorded over time. Aspects of the above method include wherein determining that the motion intensity of the wearable device matches the motion intensity of the mobile device further comprises: determining, via the processor, whether a motion signal received from the wearable device correlates to a motion signal received from the mobile device based on a correlation factor at a point in time. Aspects of the above method further comprise: determining, via the processor, whether the motion signal received from the wearable device and the motion signal received from the mobile device correlate at a subsequent point in time; and re-enabling, via the processor and in response to determining that the motion signal received from the wearable device and the motion signal received from the mobile device correlate, the enabled authentication credentials for the wearable device. Aspects of the above method include wherein the re-enabling is performed only in response to receiving a second factor authentication provided at one or more of the wearable device or the mobile device.

Embodiments include a non-transitory computer readable medium having stored thereon instructions that, when executed by a processor, perform the method, comprising: receiving, via one or more sensors of a wearable device, information corresponding to a state of a wearable device; determining, based on rules stored in a memory, whether the state of the wearable device allows for authentication credentials associated with the wearable device to be enabled; and disabling the authentication credentials when the state of the wearable device restricts the authentication credentials.

Embodiments include a wearable device, comprising: a memory having access credentials and access rules stored thereon; at least one sensor; and a processor, configured to receive, via the at least one sensor, information corresponding to a state of the wearable device, determine, based on the rules stored in the memory, whether the state of the wearable device allows for the access credentials to be enabled, and disable the access credentials when the state of the wearable device restricts the access credentials.

Embodiments include an authentication system, comprising: a first device associated with a user; and a second device also associated with the user, wherein one or both of the first and second device are enabled to perform one or more functions as long as both the first and second device are within a predetermined distance of each other and/or the user.

Aspects of the above authentication system include wherein the one or more functions are disabled on one or both of the first and second device when at least one of the following occurs: (i) the first device is not within a predetermined distance of the second device; (ii) the first device is not within a predetermined distance of the user; (iii) the second device is not within a predetermined distance of the user; and (iv) one or both of the first and second device are not being continuously worn by the user. Aspects of the above authentication system include wherein the second device corresponds to a wearable device and wherein the one or more functions are enabled as long as the user continuously wears the wearable device. Aspects of the above authentication system include wherein the one or more functions are disabled if the wearable device is not continuously worn by the user. Aspects of the above authentication system include wherein one or more biometric parameters of the user are utilized to determine whether or not the wearable device is being continuously worn by the user. Aspects of the above authentication system include wherein the first device corresponds to at least one of a mobile communication device and a wearable device. Aspects of the above authentication system include wherein the predetermined distance corresponds to a communication range of at least one of the first device and second device.

Embodiments include an access control system, comprising: a wearable device, comprising: a memory having access credentials and access rules stored thereon; a communications module configured to transmit information from the access credentials when enabled; at least one sensor; and a processor, configured to receive, via the at least one sensor, information corresponding to a state of the wearable device, determine, based on the rules stored in the memory, whether the state of the wearable device allows for the access credentials to be enabled, and disable the access credentials when the state of the wearable device restricts the access credentials; a reading device configured to receive the access credential information transmitted via the communications module of the wearable device; and an access processing module, configured to interpret the information received from the wearable device and perform an access function based at least partially on whether the information received includes access information.

Embodiments include a method, comprising: providing a wearable device including complete authentication credentials enabled for making access decisions in an access control system; receiving, via one or more sensors of the wearable device, information corresponding to a state of the wearable device; determining, based on rules stored in a memory, whether the state of the wearable device allows for the authentication credentials of the wearable device to continue to be enabled; and disabling the authentication credentials when the state of the wearable device restricts the authentication credentials.

Aspects of the above method include wherein the state of the wearable device indicates that the wearable device is being worn by a user. Aspects of the above method include wherein the state of the wearable device indicates that the wearable device has been removed from a user. Aspects of the above method include wherein prior to determining whether the state of the wearable device allows for authentication credentials associated with the wearable device to be enabled, the method further comprises: receiving, via one or more sensors of the wearable device, information corresponding to a state of a mobile device associated with the wearable. Aspects of the above method include wherein determining whether the state of the wearable device allows for authentication credentials associated with the wearable device to be enabled further comprises: determining a relationship between the wearable device and the mobile device. Aspects of the above method include wherein the authentication credentials are disabled when the relationship between the wearable device and the mobile device indicates that the wearable device is located apart from the mobile device. Aspects of the above method further comprise: determining, via a processor, that a motion intensity of the wearable device does not match a motion intensity of the mobile device based on motion rules stored in the memory; and disabling, via the processor and in response to determining that the motion intensity of the wearable device does not match the motion intensity of the mobile device, the authentication credentials for the wearable device. Aspects of the above method further comprise: determining, via a processor, that a motion intensity of the wearable device matches a motion intensity of the mobile device based on motion rules stored in the memory; and maintaining, via the processor and in response to determining that the motion intensity of the wearable device matches the motion intensity of the mobile device, the enabled authentication credentials for the wearable device. Aspects of the above method include wherein the motion intensity of the wearable device corresponds to an intensity of movement associated with the wearable device recorded over time.

Embodiments include a non-transitory computer readable medium having stored thereon instructions that, when executed by a processor, perform the above method.

Embodiments include a wearable device, comprising: a memory having complete access credentials enabled for making access decisions in an access control system and access rules stored thereon; at least one sensor; and a processor, configured to receive, via the at least one sensor, information corresponding to a state of the wearable device, determine, based on the rules stored in the memory, whether the state of the wearable device allows for the access credentials to continue to be enabled, and disable the access credentials when the state of the wearable device restricts the access credentials.

Embodiments include an authentication system, comprising: a first device associated with a user; and a second device, associated with the first device and also associated with the user, the second device including complete access credentials for making access decisions in an access control system that are enabled in a memory of the second device upon attaching the second device to the user.

Aspects of the above authentication system include wherein the first device corresponds to at least one of a mobile communication device and a wearable device. Aspects of the above authentication system include wherein one or both of the first and second device are enabled to perform one or more functions as long as both the first and second device are within a predetermined distance of each other and/or the user, and wherein the predetermined distance corresponds to a communication range of at least one of the first device and second device. Aspects of the above authentication system include wherein the one or more functions are disabled on one or both of the first and second device when at least one of the following occurs: (i) the first device is not within a predetermined distance of the second device; (ii) the first device is not within a predetermined distance of the user; (iii) the second device is not within a predetermined distance of the user; and (iv) one or both of the first and second device are not being continuously worn by the user. Aspects of the above authentication system include wherein the first device includes a first device sensor configured to record an intensity of a motion associated with the first device over time, wherein the second device includes a second device sensor configured to record an intensity of a motion associated with the second device over time, and wherein the access credentials for making access decisions in an access control system are disabled when the intensity of motion associated with the first device over time fails to match the intensity of motion associated with the second device over time. Aspects of the above authentication system include wherein the second device corresponds to a wearable device and wherein the access credentials continue to be enabled as long as the user continuously wears the wearable device. Aspects of the above authentication system include wherein the second device corresponds to a wearable device, and wherein the access credentials are disabled if the wearable device is not continuously worn by the user. Aspects of the above authentication system include wherein the second device corresponds to a wearable device, and wherein one or more biometric parameters of the user are detected by the wearable device and analyzed to determine whether or not the wearable device is being continuously worn by the user.

Embodiments include an access control system, comprising: a wearable device, comprising: a memory having complete access credentials enabled for making access decisions in the access control system and access rules stored thereon; a communications module configured to transmit information from the access credentials when enabled; at least one sensor; and a processor, configured to receive, via the at least one sensor, information corresponding to a state of the wearable device, determine, based on the rules stored in the memory, whether the state of the wearable device allows for the access credentials to continue to be enabled, and disable the access credentials when the state of the wearable device restricts the access credentials; a reading device configured to receive the access credential information transmitted via the communications module of the wearable device; and an access processing module, configured to interpret the information received from the wearable device and perform an access function based at least partially on whether the information received includes access information.

Any of the steps, functions, and operations discussed herein can be performed continuously and automatically.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

What is claimed is:

1. A method, comprising:
providing authentication credentials enabled for making access decisions in an access control system with respect to a wearable device;
receiving, via one or more sensors of the wearable device, information corresponding to a state of the wearable device;
determining, based on rules stored in a memory, whether the state of the wearable device allows for the authentication credentials enabled for making access decisions in the access control system with respect to the wearable device to continue to be enabled;
disabling the authentication credentials when the state of the wearable device restricts the authentication credentials;
comparing the information received via the one or more sensors of the wearable device with information received via one or more sensors of a mobile device;
determining, based on the comparison, that a motion intensity of the wearable device does not currently match a motion intensity of the mobile device; and
in response to determining that the motion intensity of the wearable device does not currently match the motion intensity of the mobile device, continuing disablement of the authentication credentials for the wearable device, wherein continuing disablement of the authentication credentials for the wearable device comprises at least one of revoking and deleting the authentication credentials for the wearable device.

2. The method of claim 1, wherein the state of the wearable device indicates that the wearable device is being worn by a user and thereby enabling the authentication credentials to continue to be enabled.

3. The method of claim 1, wherein the state of the wearable device indicates that the wearable device has been removed from a user and thereby disabling the authentication credentials and continuous authentication.

4. The method of claim 1, wherein prior to determining whether the state of the wearable device allows for the authentication credentials to be enabled, the method further comprises:
receiving, via one or more sensors of the wearable device, information corresponding to a state of a mobile device associated with the wearable.

5. The method of claim 4, wherein determining whether the state of the wearable device allows for the authentication credentials to be enabled further comprises:
determining a relationship between the wearable device and the mobile device.

6. The method of claim 5, wherein the authentication credentials are disabled when the relationship between the wearable device and the mobile device indicates that the wearable device is located more than a predetermined distance away from the mobile device.

7. The method of claim 5, further comprising:
determining, via a processor, that the motion intensity of the wearable device matches the motion intensity of the mobile device based on motion rules stored in the memory; and
re-enabling, via the processor and in response to determining that the motion intensity of the wearable device matches the motion intensity of the mobile device, the enabled authentication credentials for the wearable device.

8. The method of claim 1, wherein the motion intensity of the wearable device corresponds to an intensity of movement associated with the wearable device recorded over time.

9. The method of claim 1, wherein determining that the motion intensity of the wearable device matches the motion intensity of the mobile device further comprises: determining, via the processor, whether a motion signal received from the wearable device correlates to a motion signal received from the mobile device based on a correlation factor at a point in time.

10. The method of claim 9, further comprising:
determining, via the processor, whether the motion signal received from the wearable device and the motion signal received from the mobile device correlate at a subsequent point in time; and
re-enabling, via the processor and in response to determining that the motion signal received from the wearable device and the motion signal received from the mobile device correlate, the enabled authentication credentials for the wearable device.

11. The method of claim 10, wherein the re-enabling is performed only in response to receiving a second factor authentication provided at one or more of the wearable device or the mobile device.

12. A wearable device, comprising:
a memory having complete access credentials enabled for making access decisions in an access control system and access rules stored thereon;
at least one sensor; and
a processor, configured to receive, via the at least one sensor, information corresponding to a state of the wearable device, determine, based on the rules stored in the memory, whether the state of the wearable device allows for the access credentials to continue to be enabled, and disable the access credentials when the state of the wearable device restricts the access credentials, wherein the processor is further configured to compare the information corresponding to the state of the wearable device with information received via one or more sensors of a mobile device, determine, based on the comparison, that a motion intensity of the wearable device does not currently match a motion intensity of the mobile device, and in response to determining that the motion intensity of the wearable device does not currently match the motion intensity of the mobile device, disable the access credentials for the wearable device by at least one of revoking and deleting the access credentials for the wearable device.

13. An authentication system, comprising:
a first device associated with a user;
and a second device, associated with the first device and also associated with the user, the second device including complete access credentials for making access decisions in an access control system that are enabled in a memory of the second device upon attaching the second device to the user, wherein:
one of the first device and second device comprises a wearable device; and
wherein information corresponding to a state of the wearable device is received by one or more sensors of the wearable device;
wherein the state of the wearable device allows for the access credentials enabled for making access decisions in the access control system with respect to the wearable device to continue to be enabled is determined based on rules stored in memory;
wherein the access credentials are disabled when the state of the wearable device restricts the access credentials;
one of the first device and second device is configured to compare information received via one or more sensors of the first device with information received via one or more sensors of the second device; and
one of the first device and second device is configured to determine, based on the comparison, that a motion intensity of the first device does not currently match a motion intensity of the second device and in response thereto disable the access credentials by at least one of revoking and deleting the access credentials.

14. The authentication system of claim 13, wherein the first device corresponds to at least one of a mobile communication device and the wearable device.

15. The authentication system of claim 13, wherein one or both of the first and second device are enabled to perform one or more functions as long as both the first and second device are within a predetermined distance of each other and/or the user, and wherein the predetermined distance corresponds to a communication range of at least one of the first device and second device.

16. The authentication system of claim 15, wherein the one or more functions are disabled on one or both of the first and second device when at least one of the following occurs: (i) the first device is not within a predetermined distance of the second device; (ii) the first device is not within a predetermined distance of the user; (iii) the second device is not within a predetermined distance of the user; and (iv) one or both of the first and second device are not being continuously worn by the user.

17. The authentication system of claim 13, wherein the second device corresponds to the wearable device and wherein the access credentials continue to be enabled as long as the user continuously wears the wearable device.

18. The authentication system of claim 13, wherein the second device corresponds to the wearable device, and wherein the access credentials are disabled if the wearable device is not continuously worn by the user.

19. The authentication system of claim 13, wherein the second device corresponds to the wearable device, and wherein one or more biometric parameters of the user are detected by the wearable device and analyzed to determine whether or not the wearable device is being continuously worn by the user.

20. An access control system, comprising:
a wearable device, comprising:
a memory having complete access credentials enabled for making access decisions in the access control system and access rules stored thereon;
a communications module configured to transmit information from the access credentials when enabled;
at least one sensor; and
a processor, configured to receive, via the at least one sensor, information corresponding to a state of the wearable device, compare the information corresponding to the state of the wearable device with information corresponding to a state of a mobile device, determine, based on the comparison, that a motion intensity of the wearable device does not currently match a motion intensity of the mobile device, and disable the access credentials when the motion intensity of the wearable device does not match the motion intensity of the mobile device, wherein the access credentials are disabled by at least one of revoking and deleting the access credentials;

a reading device configured to receive the access credential information transmitted via the communications module of the wearable device; and an access processing module, configured to interpret the information received from the wearable device and perform an access function based at least partially on whether the information received includes access information.

\* \* \* \* \*